(12) United States Patent
Ueda et al.

(10) Patent No.: US 10,361,598 B2
(45) Date of Patent: Jul. 23, 2019

(54) ROTATING ELECTRICAL MACHINE AND ELEVATOR

(71) Applicant: Kabushiki Kaisha Toshiba, Minato-ku (JP)

(72) Inventors: Yasuhito Ueda, Yokohama (JP); Hiroshi Takahashi, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 379 days.

(21) Appl. No.: 15/259,625

(22) Filed: Sep. 8, 2016

(65) Prior Publication Data

US 2017/0077792 A1 Mar. 16, 2017

(30) Foreign Application Priority Data

Sep. 16, 2015 (JP) .................. 2015-183146

(51) Int. Cl.
*H02K 1/27* (2006.01)
*H02K 21/12* (2006.01)
(Continued)

(52) U.S. Cl.
CPC .......... *H02K 1/2733* (2013.01); *B66B 11/043* (2013.01); *H02K 1/145* (2013.01);
(Continued)

(58) Field of Classification Search
CPC .... H02K 21/125; H02K 7/1008; H02K 1/145; H02K 1/2733; H02K 11/21; B66B 11/043
See application file for complete search history.

(56) References Cited

U.S. PATENT DOCUMENTS 5,051,641 A * 9/1991 Weh .................. H02K 1/27
310/162
8,860,270 B2 10/2014 Ueda
(Continued)

FOREIGN PATENT DOCUMENTS

JP 10-126982 A 5/1998
JP 2001-333553 A 11/2001
(Continued)

*Primary Examiner* — Mohamad A Musleh
(74) *Attorney, Agent, or Firm* — Oblon, McClelland, Maier & Neustadt, L.L.P.

(57) ABSTRACT

According to one embodiment, a rotating electrical machine includes an annular winding, L (L is an arbitrary integer) stator magnetic poles, and L rotor magnetic poles having the same polarity. The L stator magnetic poles are disposed apart from each other in a rotational direction and facing the winding. The L rotor magnetic poles have the same polarity as each other. The L rotor magnetic poles are disposed apart from each other in the rotational direction and configured to face the L stator magnetic poles If an order of the fundamental wave component of a torque pulsation is N, M (M≤L) distances between centers of the adjacent poles between pole centers in one set of either the L stator magnetic poles or the L rotor magnetic poles are combinations of $(\Theta, \Theta+\Theta_1/M, \Theta+\Theta_1\times 2/M, \ldots,$ and $\Theta+_1\times(M-1)/M)$, and $\Theta_1$ satisfies the relationship $(180°/N)<\Theta_1<(540°/N)$ in the notation of electrical angle.

16 Claims, 17 Drawing Sheets

(51) Int. Cl.
*B66B 11/04* (2006.01)
*H02K 1/14* (2006.01)
*H02K 7/10* (2006.01)
*H02K 11/21* (2016.01)

(52) U.S. Cl.
CPC ......... *H02K 7/1008* (2013.01); *H02K 21/125* (2013.01); *H02K 11/21* (2016.01)

(56) References Cited

U.S. PATENT DOCUMENTS

| | | |
|---|---|---|
| 2004/0012292 A1 | 1/2004 | Kometani et al. |
| 2004/0251759 A1* | 12/2004 | Hirzel ................... H02K 21/14 310/114 |
| 2008/0211326 A1* | 9/2008 | Kang ................... H02K 21/145 310/44 |
| 2012/0249035 A1 | 10/2012 | Ueda |
| 2013/0193783 A1* | 8/2013 | Aoyama ................. H02K 21/14 310/51 |
| 2014/0139161 A1* | 5/2014 | Ueda ........................ H02P 6/16 318/400.37 |
| 2015/0015126 A1* | 1/2015 | Ueda ...................... H02K 1/145 310/68 B |
| 2015/0084465 A1 | 3/2015 | Takahashi et al. |
| 2015/0091403 A1 | 4/2015 | Ueda |
| 2015/0180289 A1 | 6/2015 | Washington |

FOREIGN PATENT DOCUMENTS

| | | |
|---|---|---|
| JP | 2002-112480 A | 4/2002 |
| JP | 3590623 B2 | 11/2004 |
| JP | 2012-217312 A | 11/2012 |
| JP | 5592848 B2 | 9/2014 |
| JP | 2015-61495 A | 3/2015 |
| JP | 2015-70767 A | 4/2015 |
| JP | 2015-520601 A | 7/2015 |

* cited by examiner

ROTATING ELECTRICAL MACHINE AND ELEVATOR

CROSS-REFERENCE TO RELATED APPLICATION

This application is based upon and claims the benefit of priority from Japanese Patent Application No. 2015-183146, filed Sep. 16, 2015; the entire contents of which are incorporated herein by reference.

FIELD

Embodiments described herein relate generally to a rotating electrical machine and an elevator.

BACKGROUND

As one type of rotating electrical machine, a transverse flux rotating electrical machine is known. The transverse flux rotating electrical machine includes a stator which includes an annular winding extending along a rotational direction of a rotary shaft, and a rotor which is rotatable relative to the stator.

In the field of rotating electrical machines, it is expected to reduce a pulsation component of torque (hereinafter, there are cases where it is referred to as a "torque pulsation") which is a factor causing vibration.

DETAILED DESCRIPTION

Figure 1:
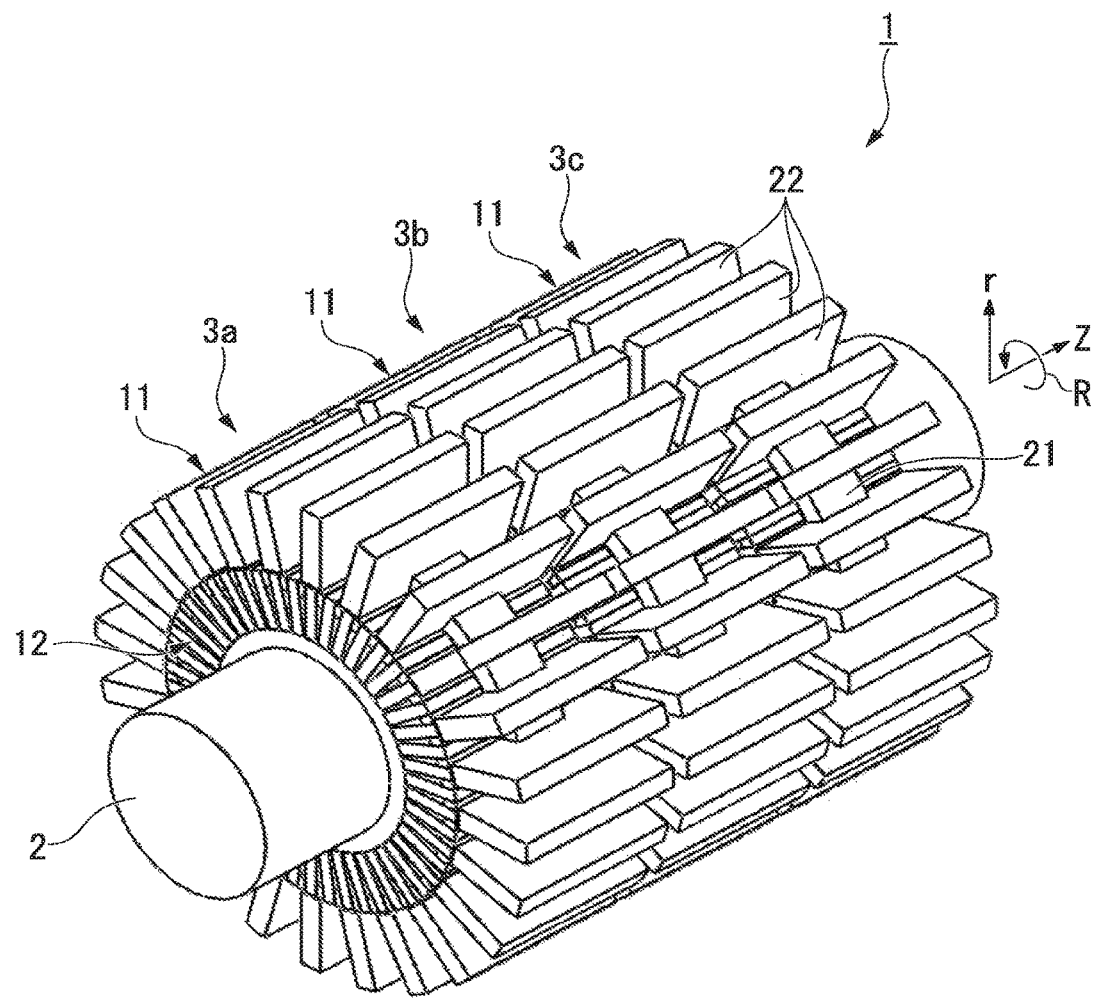
FIG. 1 is a perspective view showing a rotating electrical machine of a first embodiment.

According to one embodiment, a rotating electrical machine includes an annular winding, L (L is an arbitrary integer) stator magnetic poles, and L rotor magnetic poles. The winding extends along a rotational direction of a rotary shaft. The L stator magnetic poles are disposed apart from each other in the rotational direction and facing the winding. The L rotor magnetic poles have the same polarity as each other. The L rotor magnetic poles are disposed apart from each other in the rotational direction and configured to face the L stator magnetic poles. If an order of a fundamental wave component of a torque pulsation is N, M (M≤L) distances between centers of the adjacent poles in one set of either the L stator magnetic poles or the L rotor magnetic poles are combinations of ($\Theta$, $\Theta+\Theta_1/M$, $\Theta+\Theta_1\times2/M$, ..., and $\Theta+\Theta_1\times(M-1)/M$), and $\Theta_1$ satisfies the relationship $(180°/N)<\Theta_1<(540°/N)$ in the notation of electrical angle.

Hereinafter, rotating electrical machines and elevators of embodiments will be described with reference to the drawings. In the following description, the configurations having the same or similar functions will be assigned the same reference numerals. The redundant description thereof may be omitted.

First Embodiment

A rotating electrical machine 1 of a first embodiment will be described with reference to FIGS. 1 to 5.

FIG. 1 is a perspective view showing the rotating electrical machine 1 of the first embodiment.

As shown in FIG. 1, the rotating electrical machine 1 of this embodiment is, for example, a transverse flux rotating electrical machine. The rotating electrical machine 1 includes a rotary shaft 2, and a plurality of (e.g., three) driving elements 3a, 3b, and 3c which rotationally drive the rotary shaft 2. Further, the rotating electrical machine 1 includes a housing (not shown) which accommodates the plurality of driving elements 3a, 3b, and 3c.

The rotary shaft 2 is rotatably supported by a pair of bearings provided in the housing.

Here, for convenience of description, an axial direction Z, a radial direction r, and a rotational direction R of the rotary shaft 2 are defined as follows. The axial direction Z of the rotary shaft 2 is an extending direction of the rotary shaft 2. The radial direction r of the rotary shaft 2 is a direction substantially orthogonal to the axial direction Z and is a direction radially away from the rotary shaft 2. The rotational direction R of the rotary shaft 2 is a direction substantially orthogonal to the axial direction Z and the radial direction r and is a direction rotating around the center line of the rotary shaft 2 while maintaining a certain distance from the rotary shaft 2.

Figure 2:
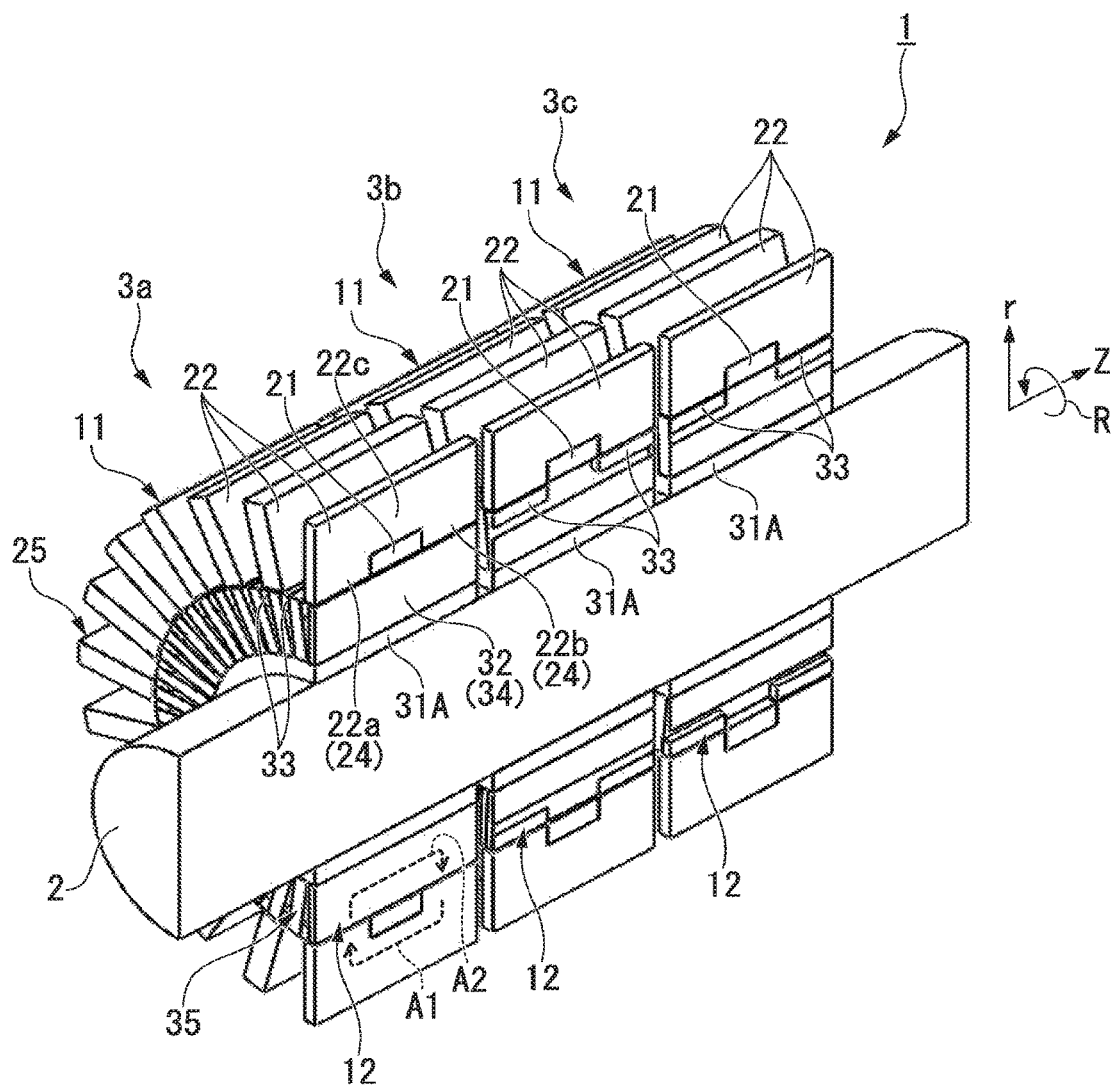
FIG. 2 is a sectional perspective view showing the rotating electrical machine of the first embodiment.

FIG. 2 is a sectional perspective view showing the rotating electrical machine 1 of this embodiment.

As shown in FIG. 2, each of the plurality of driving elements 3a, 3b, and 3c includes a stator 11 and a rotor 12. In other words, the rotating electrical machine 1 includes a plurality of sets of stator 11 and rotor 12 in the axial direction Z of the rotary shaft 2. Here, the rotating electrical machine 1 has a multiphase structure. That is, in the plurality of sets, the relative positional relationships between the stator 11 and the rotor 12 in the rotational direction R are different from each other. A "relative position" is phase. That is, the rotor 12 (or the stator 11) of each of the driving elements 3a, 3b, and 3c has a predetermined phase difference in the rotational direction R.

For example, the rotating electrical machine 1 of this embodiment is a motor having a three-phase structure. That is, the set of stator 11 and rotor 12 of the first driving element 3a corresponds to "a-phase", the set of stator 11 and rotor 12 of the second driving element 3b corresponds to "b-phase", and the set of stator 11 and rotor 12 of the third driving element 3c corresponds to "c-phase". The three phases are generally expressed using U, V, and W. In the following description, when referred to simply as the "stator 11" or the "rotor 12", these expressions are used not to distinguish the phase of the stators or the rotors.

First, the stator 11 will be described.

Figure 3:
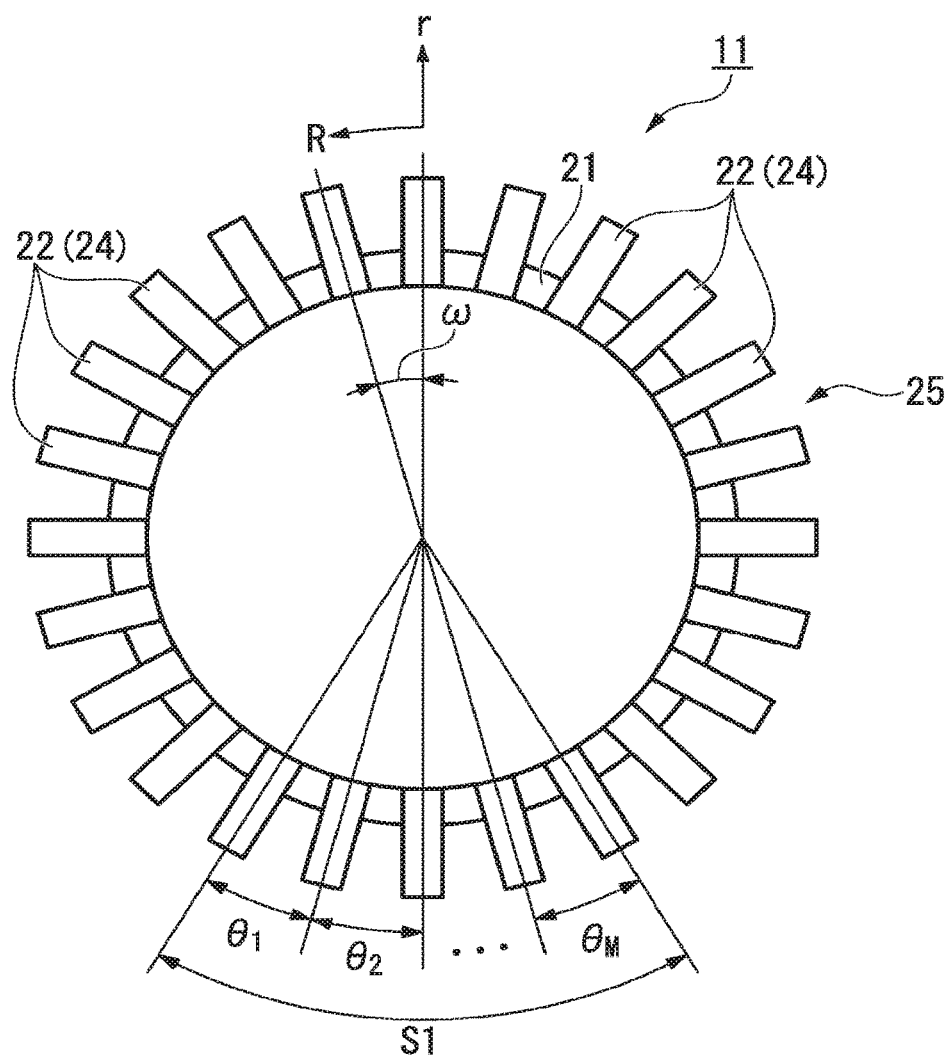
FIG. 3 is a front view showing a stator of the first embodiment.

FIG. 3 is a front view showing the stator 11 of this embodiment.

As shown in FIG. 3, each stator 11 includes a ring coil 21 and a plurality of U-shaped iron cores 22.

The ring coil 21 is an example of the "winding". The ring coil 21 is provided in an annular shape along the rotational direction R of the rotary shaft 2. That is, the ring coil 21 is wound in the rotational direction R of the rotary shaft 2 with the rotary shaft 2 as the center. As shown in FIG. 2, the ring coil 21 is provided one for each phase. That is, the rotating electrical machine 1 of this embodiment includes a total of three ring coils 21. For example, currents having phases different from each other by 120° are supplied to the three ring coils 21. The phase of the current which is supplied to the ring coil 21 is not limited to the above example.

As shown in FIG. 3, the plurality of the U-shaped iron cores 22 are disposed separately to be spaced apart from each other in the rotational direction R of the rotary shaft 2. Further, the portions of the ring coil 21, which are not covered with the U-shaped iron cores 22, face air gaps between the plural U-shaped iron cores 22.

As shown in FIG. 2, each U-shaped iron core 22 is formed in a U-shape and includes a first portion 22a, a second portion 22b, and a third portion 22c. The first portion 22a faces the ring coil 21 in the axial direction Z of the rotary shaft 2. The second portion 22b is located on the side opposite to the first portion 22a with respect to the ring coil 21. That is, the second portion 22b faces the ring coil 21 from the side opposite to the first portion 22a. The third portion 22c faces the ring coil 21 from the outside (i.e., the outer periphery side in the radial direction r) of the annular shape of the ring coil 21. In this way, the U-shaped iron core 22 surrounds a portion of the ring coil 21 from three directions by a recess portion of the U-shape. The first portion 22a and the second portion 22b of the U-shaped iron core 22 form magnetic poles facing the rotor 12. In this embodiment, each of the first portion 22a and the second portion 22b of the U-shaped iron core 22 is an example of the "stator magnetic pole 24".

The stator 11 of this embodiment includes a first ferromagnetic body unit 25 formed by the plurality of the U-shaped iron cores 22 as described above. The first ferromagnetic body unit 25 includes a plurality of the stator magnetic poles 24 disposed apart from each other in the rotational direction R of the rotary shaft 2. The stator 11 of this embodiment includes, for example, twenty-four stator magnetic poles 24 as the L (L is an arbitrary integer) stator magnetic poles disposed apart from each other in the rotational direction R of the rotary shaft 2.

Next, the rotor 12 will be described.

As shown in FIG. 2, each rotor 12 is disposed, for example, inside the stator 11 and is rotatable in the rotational direction R of the rotary shaft 2. Specifically, the rotor 12 is disposed with an air gap formed between the rotor 12 and the first ferromagnetic body unit 25 of the stator 11. The rotor 12 is rotatable relative to the stator 11 with the rotary shaft 2 as the center.

Figure 4:
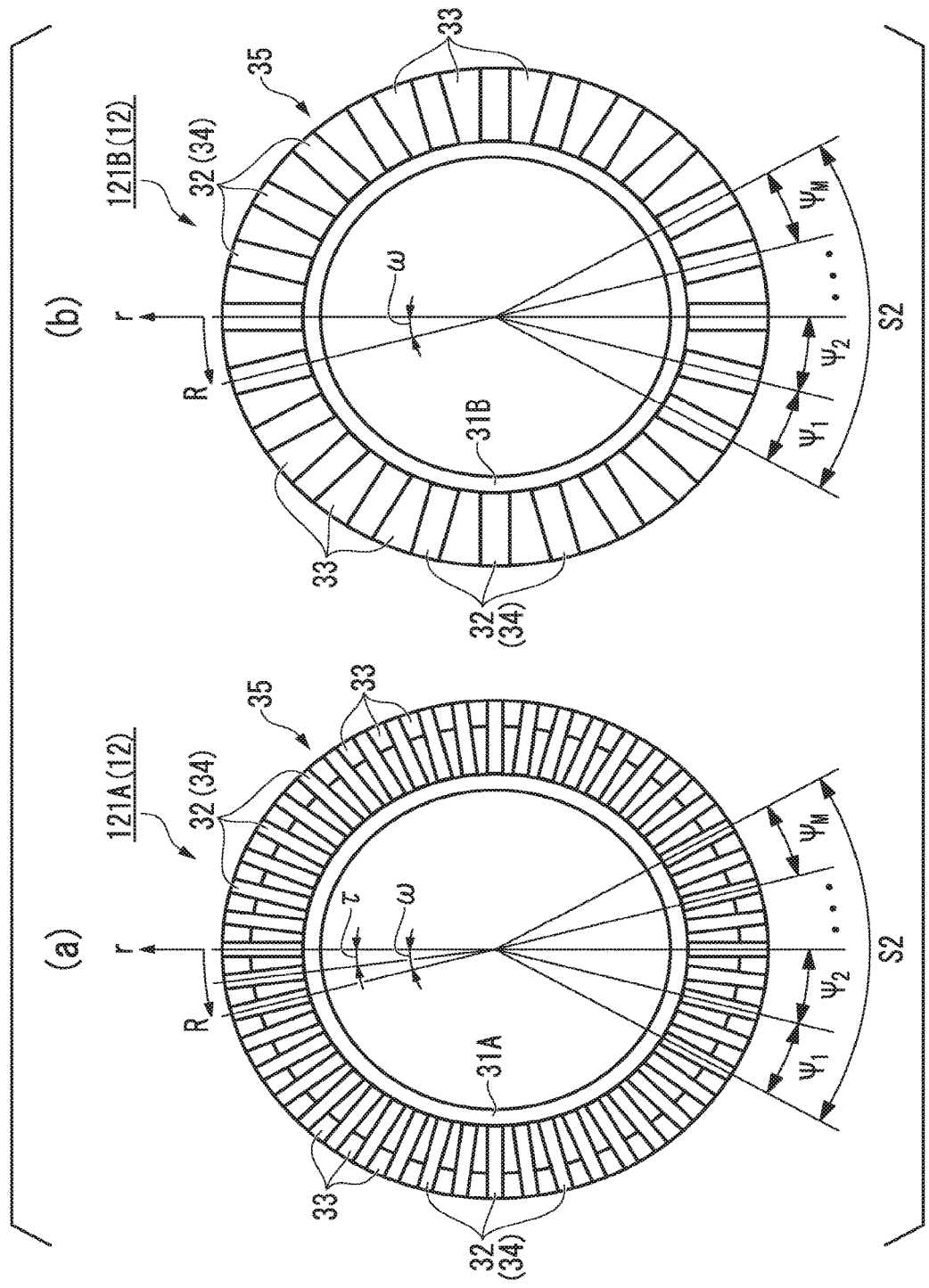
FIG. 4 is a front view showing rotors of the first embodiment.

FIG. 4 is a front view showing some types of the rotor 12 of this embodiment.

In FIG. 4, two types of rotors 121A and 121B which can be adopted as the rotor 12 are shown. That is, the rotating electrical machine 1 may include either the rotor 121A or the rotor 121B. In the following description, when expressing the rotor 121A and the rotor 121B without distinction, they are referred to simply as the rotor 12.

First, the rotor 121A shown in (a) of FIG. 4 will be described.

As shown in (a) of FIG. 4, the rotor 121A includes a nonmagnetic ring 31A, a plurality of I-shaped iron cores 32, and a plurality of permanent magnets 33.

The nonmagnetic ring 31A is formed in the shape of a ring surrounding the rotary shaft 2. The nonmagnetic ring 31A is attached to the outer peripheral surface of the rotary shaft 2.

Each of the plurality of the I-shaped iron cores 32 is formed in the shape of a plate along the radial direction r of the rotary shaft 2. The I-shaped iron core 32 is disposed on the outer periphery side of the nonmagnetic ring 31A in the radial direction r of the rotary shaft 2 and is fixed to the outer peripheral surface of the nonmagnetic ring 31A. The plurality of the I-shaped iron cores 32 are disposed separately to be spaced apart from each other in the rotational direction R of the rotary shaft 2.

As shown in FIG. 2, the I-shaped iron core 32 extends in the axial direction Z of the rotary shaft 2. The I-shaped iron core 32 faces the ring coil 21 of the stator 11 and the first portion 22a and the second portion 22b of the U-shaped iron core 22 in the radial direction r of the rotary shaft 2. The I-shaped iron core 32 is magnetized by permanent magnets 33 (described later), thereby forming a magnetic pole which faces the stator 11. In the rotor 121A, the I-shaped iron core 32 is an example of the "rotor magnetic pole 34".

The plurality of permanent magnets 33 are disposed alternating with the plurality of the I-shaped iron cores 32 in the rotational direction R of the rotary shaft 2, as shown in (a) of FIG. 4. The magnetization directions of two permanent magnets 33 adjacent to each other in the rotational direction R of the rotary shaft 2 have, for example, phases different from each other by 180°.

Further, as shown in FIG. 2, the permanent magnets 33 are respectively disposed at a position which faces the first portion 22a of the U-shaped iron core 22 of the stator 11 and a position which faces the second portion 22b of the U-shaped iron core 22 of the stator 11. The magnetization directions of two permanent magnets 33 adjacent to each other in the axial direction Z of the rotary shaft 2 have, for example, phases different from each other by 180°.

The rotor 121A includes a second ferromagnetic body unit 35 formed by the plurality of the I-shaped iron cores 32 and the plurality of the permanent magnets 33 as described above. The second ferromagnetic body unit 35 includes a plurality of the rotor magnetic poles 34 disposed apart from each other in the rotational direction R of the rotary shaft 2. The plurality of the rotor magnetic poles 34 include L rotor magnetic poles 34 having the same polarity as each other and disposed apart from each other in the rotational direction R of the rotary shaft 2. The expression "polarity is the same" as referred to in this application means that polarity (e.g., the N-pole or the S-pole) with respect to the stator 11 (i.e., the stator magnetic pole 24) is the same.

For example, in the rotor 121A shown in (a) of FIG. 4, the plurality of the I-shaped iron cores 32 are disposed at substantially half the pitch of the U-shaped iron cores 22 of the stator 11. In this way, the rotor 121A includes the rotor magnetic poles 34, the number of which is double (e.g., 48) the number of the stator magnetic poles 24. Here, the plurality of the rotor magnetic poles 34 are alternately magnetized like "N-pole, S-pole, N-pole, S-pole, and . . ." in the rotational direction R of the rotary shaft 2 by the plurality of the permanent magnets 33. For this reason, the plurality of the rotor magnetic poles 34 of the rotor 121A include L rotor magnetic poles 34 in which the N-pole faces the stator 11, and L rotor magnetic poles 34 in which the S-pole faces the stator 11. In other words, in the rotor 121A, among the plurality of the rotor magnetic poles 34, the rotor magnetic poles 34 which are disposed every other correspond to the "L rotor magnetic poles 34". In the following description, in a case of being referred to simply as "L rotor magnetic poles", it refers to "L rotor magnetic poles having the same polarity as each other".

Next, the rotor 121B shown in (b) of FIG. 4 will be described.

As shown in (b) of FIG. 4, the rotor 121B includes a magnetic ring 31B, the plurality of I-shaped iron cores 32, and the plurality of permanent magnets 33.

The magnetic ring 31B is formed in the shape of a ring surrounding the rotary shaft 2. The magnetic ring 31B is attached to the outer peripheral surface of the rotary shaft 2.

Each of the plurality of the I-shaped iron cores 32 is formed in the shape of a plate along the radial direction r of the rotary shaft 2. The I-shaped iron core 32 is disposed on the outer periphery side of the magnetic ring 31B in the radial direction r of the rotary shaft 2 and is fixed to the outer peripheral surface of the magnetic ring 31B. The plurality of the I-shaped iron cores 32 are disposed separately to be spaced apart from each other in the rotational direction R of the rotary shaft 2.

The I-shaped iron core 32 extends in the axial direction Z of the rotary shaft 2. In this way, the I-shaped iron core 32 faces the ring coil 21 of the stator 11 and the first portion 22a and the second portion 22b of the U-shaped iron core 22 in the radial direction r of the rotary shaft 2. The I-shaped iron core 32 is magnetized by permanent magnets 33 (described later), thereby forming a magnetic pole which faces the stator 11. In the rotor 121B, the I-shaped iron core 32 is an example of the "rotor magnetic pole 34".

The plurality of the permanent magnets 33 are disposed alternating with the plurality of the I-shaped iron cores 32 in the rotational direction R of the rotary shaft 2, as shown in (b) of FIG. 4. The magnetization directions of two permanent magnets 33 adjacent to each other in the rotational direction R of the rotary shaft 2 have, for example, the same phase. In the rotor 121B, the permanent magnet 33 is an example of the "rotor magnetic pole 34".

Further, the permanent magnets 33 are respectively disposed at a position facing the first portion 22a of the U-shaped iron core 22 of the stator 11 and a position facing the second portion 22b of the U-shaped iron core 22. The magnetization directions of two permanent magnets 33 adjacent to each other in the axial direction Z of the rotary shaft 2 have, for example, phases different from each other by 180°.

The rotor 121B includes the second ferromagnetic body unit 35 formed by the plurality of the I-shaped iron cores 32 and the plurality of the permanent magnets 33 as described above. The second ferromagnetic body unit 35 includes the plurality of the rotor magnetic poles 34 disposed apart from each other in the rotational direction R of the rotary shaft 2. The plurality of the rotor magnetic poles 34 include L rotor magnetic poles 34 having the same polarity as each other and disposed apart from each other in the rotational direction R of the rotary shaft 2.

For example, in the rotor 121B shown in (b) of FIG. 4, if the plurality of the permanent magnets 33 have the N-pole, the plurality of the I-shaped iron cores 32 are magnetized to the S-pole. Further, if the plurality of permanent magnets 33 have the S-pole, the plurality of the I-shaped iron cores 32 are magnetized to the N-pole. For this reason, the plurality of the rotor magnetic poles 34 of the rotor 121B include L rotor magnetic poles 34 in which the N-pole faces the stator 11, and L rotor magnetic poles 34 in which the S-pole faces the stator 11. In other words, in the rotor 121B, among the plurality of the rotor magnetic poles 34, the rotor magnetic poles 34 which are disposed every other correspond to the "L rotor magnetic poles 34".

Next, a distance between centers of the adjacent poles of the stator 11 and a distance between centers of the adjacent poles of the rotor 12 will be described. In this embodiment, either M distances between centers of the adjacent poles ($\theta_1$, $\theta_2$, . . . , and $\theta_M$) of the stator 11 or M distances between centers of the adjacent poles ($\psi_1$, $\psi_2$, . . . , and $\psi_M$) of the rotor 12 are set unequally.

That is, as shown in FIG. 3, each stator 11 includes the L stator magnetic poles 24. Then, the L stator magnetic poles 24 are disposed based on arbitrary M (M is an integer and M≤L) distances between the centers of the adjacent poles ($\theta_1$, $\theta_2$, . . . , and $\theta_M$).

In an example, the M distances between the centers of the adjacent poles ($\theta_1$, $\theta_2$, . . . , and $\theta_M$) are set between M+1 stator magnetic poles 24 arranged continuously in the rotational direction R. Then, the stator 11 includes a plurality of sets of the stator magnetic poles 24 (hereinafter, each set is referred to as a magnetic pole set S1), in each set of which the M distances between the centers of the adjacent poles ($\theta_1$, $\theta_2$, . . . , and $\theta_M$) are set, as described above. Further, the stator magnetic pole 24 which is located at the boundary between two magnetic pole sets S1 adjacent to each other is shared by the two magnetic pole sets S1.

Similarly, as shown in FIG. 4, each rotor 12 includes the L rotor magnetic poles 34. Then, the L rotor magnetic poles 34 are disposed based on arbitrary M (M is an integer and M≤L) distances between the centers of the adjacent poles ($\psi_1$, $\psi_2$, . . . , and $\psi_M$).

In an example, the M distances between the centers of the adjacent poles ($\psi_1$, $\psi_2$, . . . , and $\psi_M$) are set between M+1 rotor magnetic poles 34 arranged continuously in the rotational direction R, among the L rotor magnetic poles 34. Then, the rotor 12 includes a plurality of sets of the M+1 rotor magnetic poles 34 (hereinafter, each set is referred to as a magnetic pole set S2), in each set of which the M distances between the centers of the adjacent poles ($\psi_1$, $\psi_2$, . . . , and $\psi_M$) are set, as described above. Further, the rotor magnetic pole 34 which is located at the boundary between two magnetic pole sets S2 adjacent to each other is shared by the two magnetic pole sets S2.

The "distance between centers of the adjacent poles" as referred to in this application is an angle (a mechanical angle or an electrical angle) between the center (i.e., pole center) of one magnetic pole out of two magnetic poles which are targets in the rotational direction R, and the center (i.e., pole center) of the other magnetic pole out of the two magnetic poles in the rotational direction R (refer to FIGS. 3 and 4).

Further, the "distance between centers of the adjacent poles" may be referred to as an "pitch between centers of the adjacent poles".

Further, in this embodiment, the M distances between the centers of the adjacent poles ($\theta_1, \theta_2, \ldots,$ and $\theta_M$) of the stator 11 or the M distances between the centers of the adjacent poles ($\psi_1, \psi_2, \ldots,$ and $\psi_M$) of the rotor 12 are set unequally. Specifically, if the period (a mechanical angle) of a torque pulsation to be reduced is 4, the M distances between the centers of the adjacent poles ($\theta_1, \theta_2, \ldots,$ and $\theta_M$) or the M distances between the centers of the adjacent poles ($\psi_1, \psi_2, \ldots,$ and $\psi_M$) are a combination of ($\Theta$, $\Theta+\phi/M, \Theta+\phi\times 2/M, \ldots,$ and $\Theta+\phi\times(M-1)/M$). Here, $\Theta$ is an angle which is arbitrarily set.

The expression "being a combination" as referred to in this application means that, for example, ($\theta_1, \theta_2, \theta_3, \ldots$) may correspond to ($\Theta, \Theta+\phi/M, \Theta+\phi\times 2/M, \ldots$) in this order, or ($\theta_1, \theta_2, \theta_3, \ldots$) may correspond to ($\Theta, \Theta+\phi/M, \Theta+\phi\times 2/M, \ldots$) in the order different from this order. Further, the expression, ($\theta_1, \theta_2, \theta_3, \ldots$) corresponds to ($\Theta, \Theta+\phi/M, \Theta+\phi\times 2/M, \ldots$) in this order, means that $\theta_1$ is set to $\Theta$, $\theta_2$ is set to $\Theta+\phi/M$, and $\theta_3$ is set to $\Theta+\phi\times 2/M$. On the other hand, the expression, ($\theta_1, \theta_2, \theta_3, \ldots$) corresponds to ($\Theta, \Theta+\phi/M, \Theta+\phi\times 2/M, \ldots$) in the order different from this order, means, for example, that $\theta_2$ is set to $\Theta$, $\theta_3$ is set to $\Theta+\phi/M$, and $\theta_1$ is set to $\Theta+\phi\times 2/M$. The same also applies to the distances between the centers of the adjacent poles ($\psi_1, \psi_2, \ldots,$ and $\psi_M$) of the rotor 12.

More generally, in a case where the number of the stator magnetic poles 24 or the rotor magnetic poles 34 is L in the rotational direction R, in order to reduce $N\times 1, N\times 2, \ldots,$ and $N\times(M-1)$-order pulsation components (M and N are integers and M≤L) with respect to the basic order in the notation of electrical angle, one set of either the M distances between the centers of the adjacent poles ($\theta_1, \theta_2, \ldots,$ and $\theta_M$) of the stator 11 or the M distances between the centers of the adjacent poles ($\psi_1, \psi_2, \ldots,$ and $\psi_M$) of the rotor 12 is a combination of ($\Theta, \Theta+\Theta_1/M, \Theta+\Theta_1\times 2/M, \ldots,$ and $\Theta+\Theta_1\times(M-1)/M$). Here, $\Theta_1$ is, for example, $(360°/N)$ in the notation of electrical angle.

Further, the relationship $\Theta_1=(360°/N)$ is an example of $\Theta_1$. $\Theta_1$ may have a range in the angle. It is favorable if $\Theta_1$ satisfies the relationship $(180°/N)<\Theta_1<(540°/N)$ in the notation of electrical angle.

In this embodiment, M distances between the centers of the adjacent poles increase in order by $\Theta_1/M$ in the rotational direction R. That is, either the M distances between the centers of the adjacent poles ($\theta_1, \theta_2, \ldots,$ and $\theta_M$) of the stator 11 or the M distances between the centers of the adjacent poles ($\psi_1, \psi_2, \ldots,$ and $\psi_M$) of the rotor 12 increase in order by $\Theta_1/M$ in the rotational direction R.

Further, if the distance between the centers of the adjacent poles in the other set (i.e., the set in which the distances between the centers of the adjacent poles are equal) of either the L stator magnetic poles 24 or the L rotor magnetic poles 34 is $\omega$, $\Theta$ is set such that the sum of the M distances between the centers of the adjacent poles set unequally is M$\omega$.

In other words, in the rotating electrical machine 1 which includes the rotor 121A shown in (a) of FIG. 4, for example, in a case where the M distances between the centers of the adjacent poles of the stator magnetic poles 24 are set unequally, $\Theta$ is set such that the sum of the M distances between the centers of the adjacent poles of the stator magnetic poles 24 is 2M$\tau$. Here, $\tau$ is a pole pitch (e.g., the distance between the centers of the permanent magnets 33 adjacent to each other) of the magnetic poles in the rotor 12.

In the rotor 121B shown in (b) of FIG. 4, $\tau$ is the distance between the center of the I-shaped iron core 32 in the rotational direction R and the center of the permanent magnet 33 in the rotational direction R.

Further, the same also applies to a case where in the rotors 121A and 121B, the M distances between the centers of the adjacent poles of the rotor magnetic poles 34 are set unequally. That is, in a case where the M distances between the centers of the adjacent poles of the rotor magnetic poles 34 are set unequally, if each of equal distances between the centers of the adjacent poles of the plurality of stator magnetic poles 24 is $\omega$, $\Theta$ is set such that the sum of the M distances between the centers of the adjacent poles of the rotor magnetic poles 34 is M$\omega$.

Further, the sum of the M distances between the centers of the adjacent poles is not limited to the above example. That is, the sum of the M distances between the centers of the adjacent poles may neither be M$\omega$ nor 2M$\tau$.

Next, a specific example will be described. For example, if the number of stator magnetic poles 24 is 24 (L=24), the number of distances between the centers of the adjacent poles is 2 (M=2), and a pulsation of the sixth-order harmonic component (N=6) due to a three-phase structure is a reduction target, the relationship, electrical angle $\Theta_1/M=((360°/6)/2)=30°$, is established. Further, in the expression of the electrical angle, an electrical angle corresponding to two poles (i.e., twice the magnetic pole pitch) is 360°.

Figure 5:
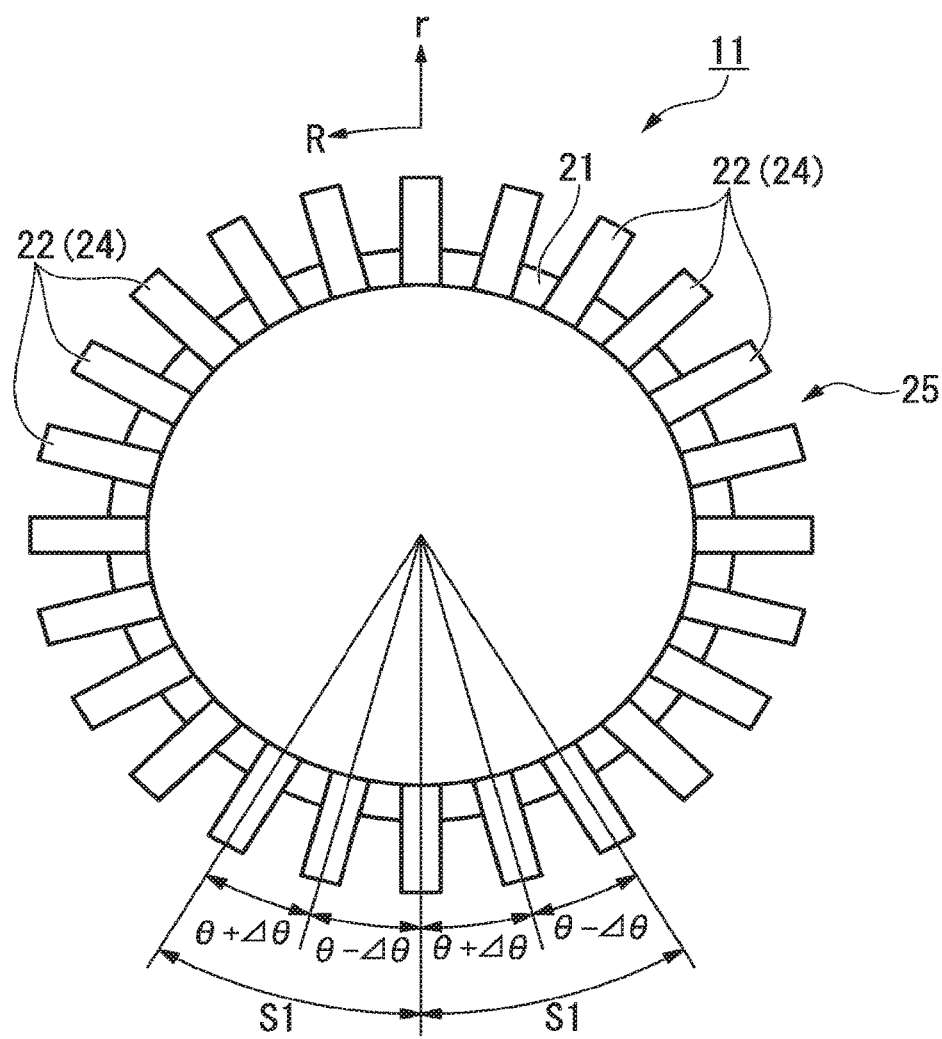
FIG. 5 is a front view showing an example of the stator of the first embodiment.

FIG. 5 is a front view showing an example of the stator 11 of this embodiment.

If the above-described specific example is shown by a different expression, the plurality of stator magnetic poles 24 are alternately disposed based on two different distances between the centers of the adjacent poles ($\theta+\Delta\theta$ and $\theta-\Delta\theta$). For example, if the number of pole pairs is p, the $\theta$ can be expressed by the expression, $\theta=(360°/p)$. Further, if the period (a mechanical angle) of the torque pulsation to be reduced is $\phi$, the $\Delta\theta$ satisfies, the relationship $0<\Delta\theta<(\phi/2)$. For example, $\Delta\theta$ is $\phi/4$. That is, if the period (a mechanical angle) of the torque pulsation to be reduced is $\phi$, the two distances between the centers of the adjacent poles $(0-\Delta 0$ and $0+\Delta 0)$ become $\Theta$ and $(\Theta+\phi/2)$, and thus the relationship $(\theta-\Delta\theta)=\Theta$ is established and the $\Delta\theta$ becomes $\phi/4$.

For example, in a case where the number of stator magnetic poles is 24 and an attempt to reduce a torque pulsation having a 2.5° period (the sixth-order harmonic component) is made, the plurality of stator magnetic poles 24 are disposed based on two distances between the centers of the adjacent poles $(15+2.5/4)$ ° and $(15-2.5/4)°$. The rotor magnetic pole 34 may also be expressed in the same manner as described above.

Further, in the rotating electrical machine 1, in addition to the unequal distance between the centers of the adjacent poles described above, a skew which rotates the U-shaped iron core 22 around the radial direction r may be provided.

According to the rotating electrical machine 1 having such a configuration, it is possible to attain a reduction in pulsation component of torque with respect to a rotational position at the time of non-energization and the time of energization. Further, the principle in which it is possible to reduce a torque pulsation by the above configuration will be described in detail later in the description of the rotating electrical machine 1 of a second embodiment.

Second Embodiment

Next, the rotating electrical machine 1 of a second embodiment will be described.

FIGS. 6 to 10 show the rotating electrical machine 1 of the second embodiment. This embodiment is different from the first embodiment in terms of the configurations of the stator 11 and the rotor 12. Other configurations of this embodiment are the same as those of the first embodiment.

Figure 6:
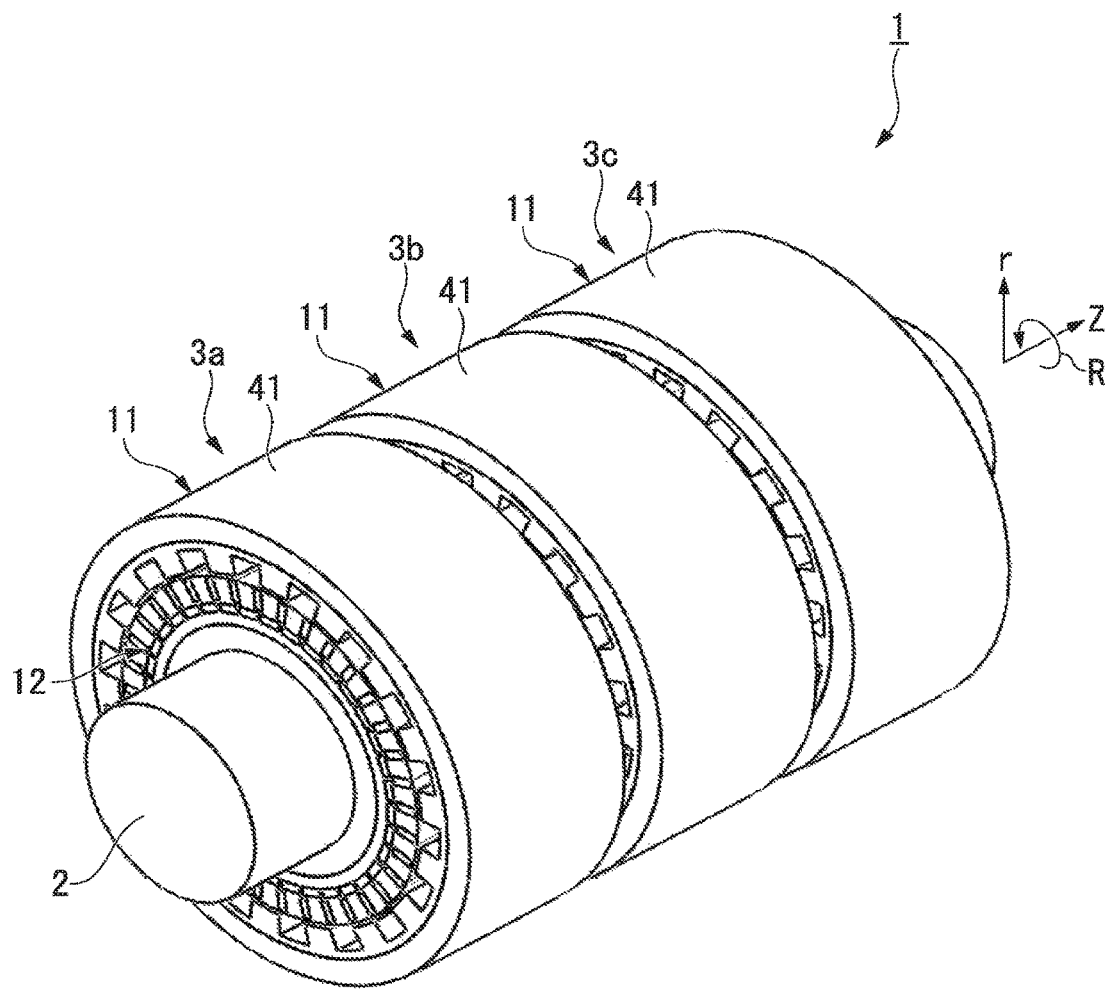
FIG. 6 is a perspective view showing a rotating electrical machine of a second embodiment.

FIG. 6 is a perspective view showing the rotating electrical machine 1 of this embodiment.

As shown in FIG. 6, the rotating electrical machine 1 of this embodiment is a transverse flux rotating electrical machine having a three-phase structure, similar to the first embodiment. That is, the rotating electrical machine 1 includes the plurality of driving elements 3a, 3b, and 3c corresponding to "a-phase", "b-phase", and "c-phase". Each of the driving elements 3a, 3b, and 3c includes the stator 11 and the rotor 12.

First, the stator 11 of this embodiment will be described.

Figure 7:
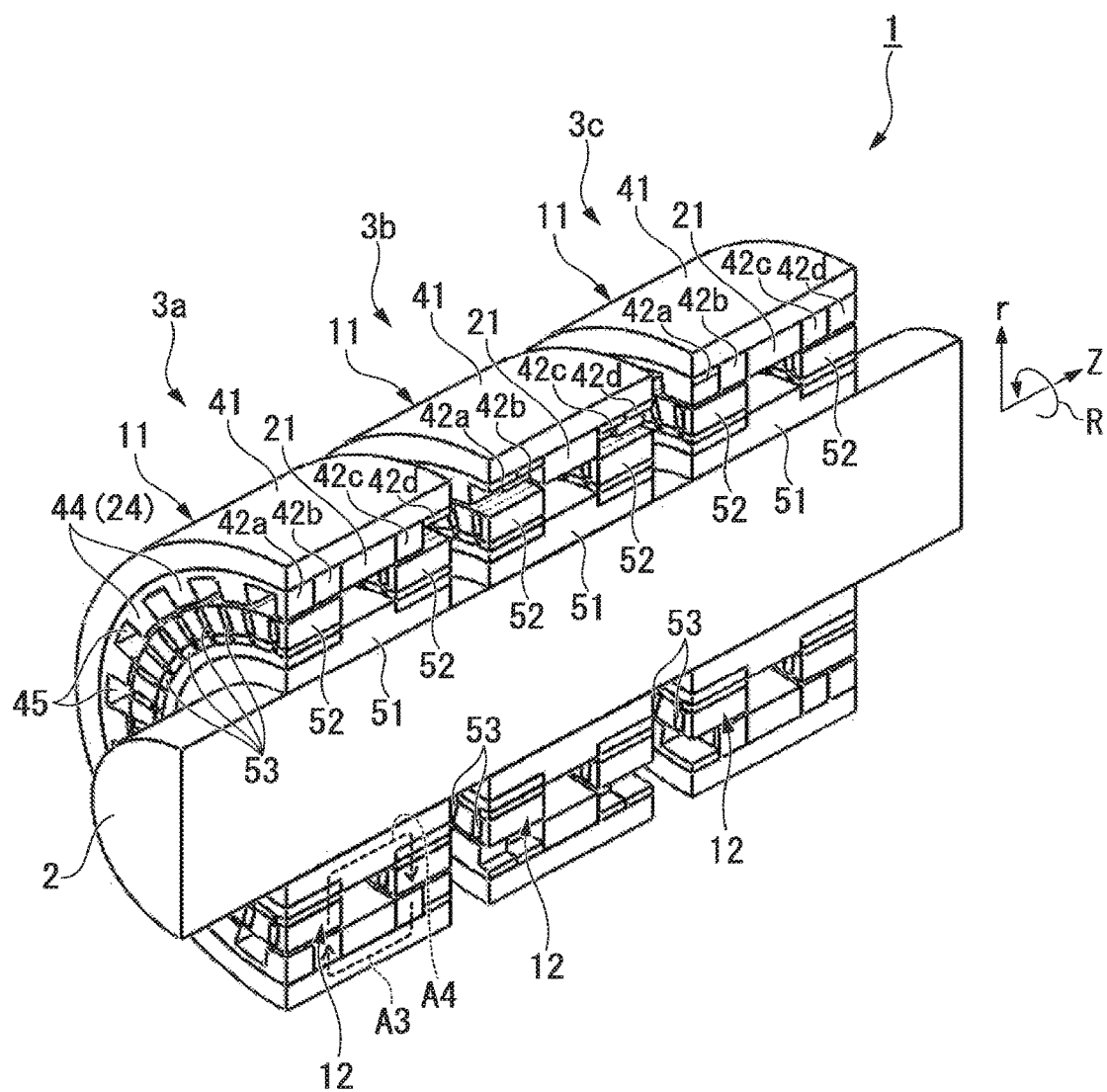
FIG. 7 is a sectional perspective view showing the rotating electrical machine of the second embodiment.

FIG. 7 is a sectional perspective view showing the rotating electrical machine 1 of this embodiment.

As shown in FIG. 7, each stator 11 includes a bulk iron core 41, the ring coil 21, and a plurality of laminated steel plates (i.e., electromagnetic steel plates) 42a, 42b, 42c, and 42d.

The bulk iron core 41 is formed in the shape of a cylinder along the rotational direction R of the rotary shaft 2.

The ring coil 21 is formed in the shape of a ring along the rotational direction R of the rotary shaft 2 and fixed to the inner peripheral surface of the bulk iron core 41. The ring coil 21 is provided one for each phase.

Figure 8:
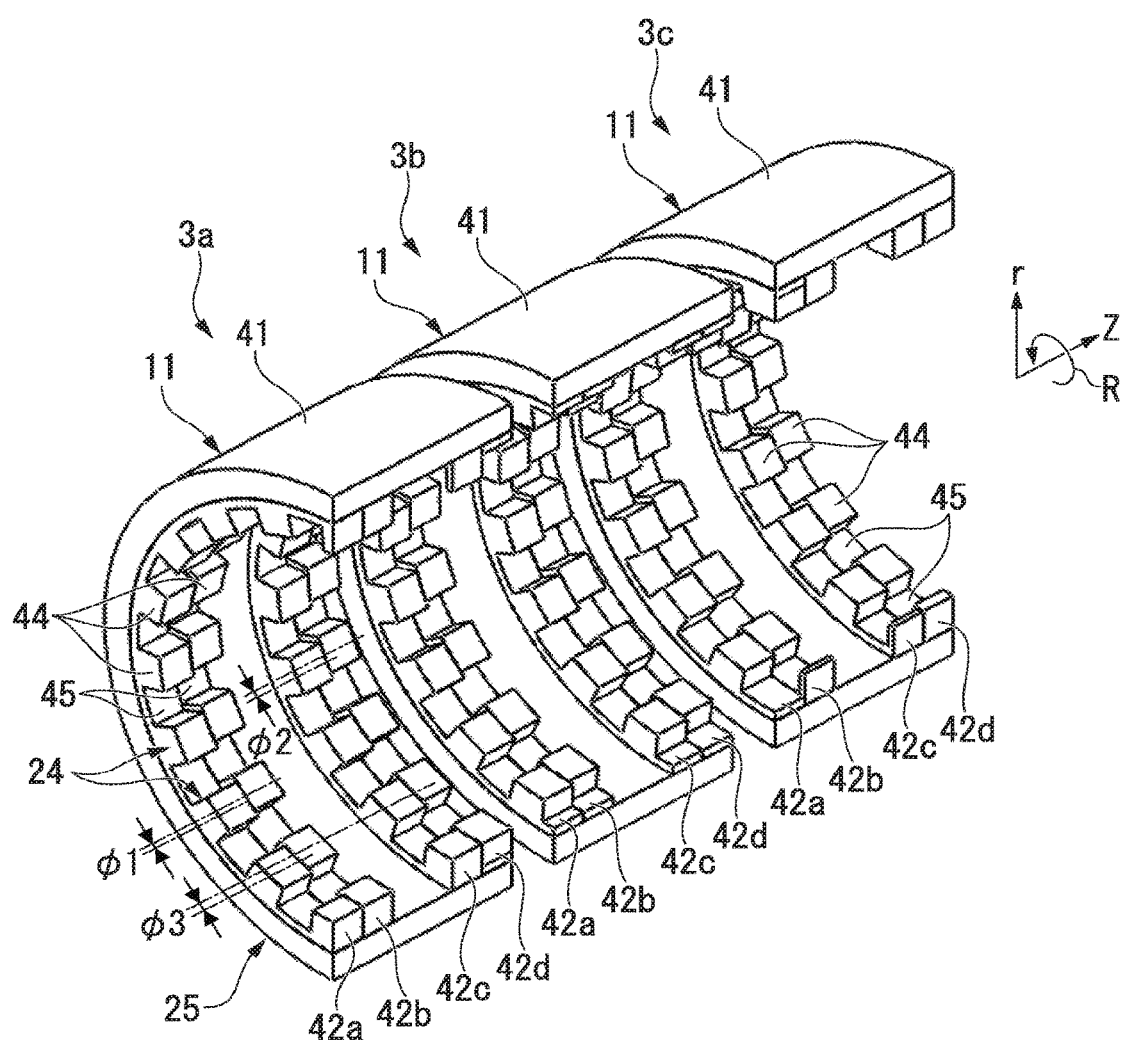
FIG. 8 is a sectional perspective view showing a portion of a stator of the second embodiment.

FIG. 8 is a sectional perspective view showing a portion of the stator 11 of this embodiment. In FIG. 8, for convenience of description, the illustration of the ring coil 21 is omitted.

As shown in FIG. 8, the plurality of laminated steel plates 42a, 42b, 42c, and 42d include first to fourth laminated steel plates 42a, 42b, 42c, and 42d. The first and second laminated steel plates 42a and 42b are provided on the first side in the axial direction Z of the rotary shaft 2 with respect to the ring coil 21. On the other hand, the third and fourth laminated steel plates 42c and 42d are provided on the second side (i.e., the side opposite to the laminated steel plates 42a and 42b) in the axial direction Z of the rotary shaft 2 with respect to the ring coil 21. In other words, the ring coil 21 is sandwiched between a set of laminated steel plates 42a and 42b and the other set of laminated steel plates 42c and 42d.

Figure 9:
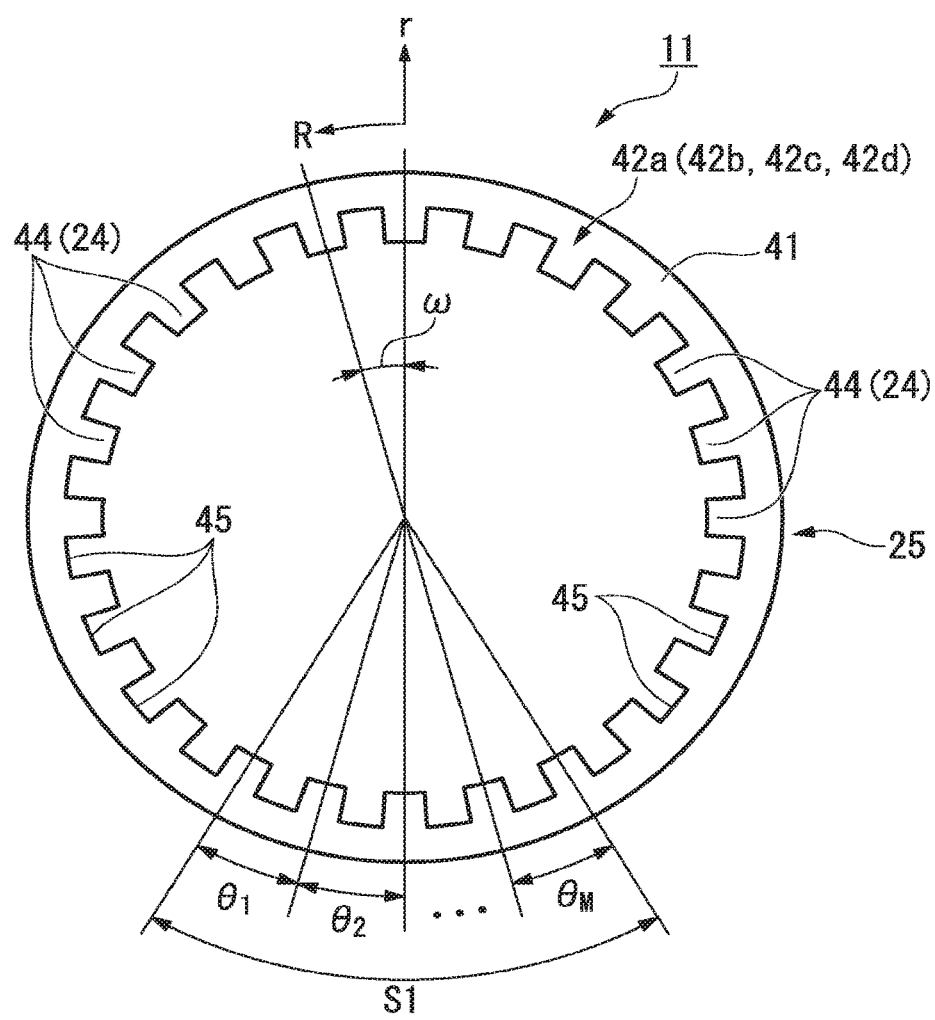
FIG. 9 is a front view showing a laminated steel plate of the stator of the second embodiment.

FIG. 9 is a front view showing the laminated steel plate 42a of the stator 11 of this embodiment.

As shown in FIGS. 8 and 9, each of the laminated steel plates 42a, 42b, 42c, and 42d includes a plurality of salient portions 44 and a plurality of recess portions 45 alternately provided in the rotational direction R of the rotary shaft 2. Each salient portion 44 protrudes toward the inner periphery side of the stator 11. The recess portion 45 is provided between two salient portions 44 adjacent to each other. The plurality of salient portions 44 of the laminated steel plates 42a, 42b, 42c, and 42d are disposed to be separated on both sides of the ring coil 21. Further, the salient portions 44 of the laminated steel plates 42b and 42c face the ring coil 21. Further, the portions of the ring coil 21 that the salient portion 44s does not face air gaps formed by the recess portions 45.

In this embodiment, one stator magnetic pole 24 is formed by one salient portion 44 of the first laminated steel plate 42a and one salient portion 44 of the second laminated steel plate 42b, which are arranged in the axial direction Z of the rotary shaft 2. In other words, this stator magnetic pole 24 is divided into two portions by the first laminated steel plate 42a and the second laminated steel plate 42b. Similarly, the other stator magnetic pole 24 is formed by one salient portion 44 of the third laminated steel plate 42c and one salient portion 44 of the fourth laminated steel plate 42d, which are arranged in the axial direction Z of the rotary shaft 2. In other words, this stator magnetic pole 24 is divided into two portions by the third laminated steel plate 42c and the fourth laminated steel plate 42d.

The stator 11 of this embodiment includes a first ferromagnetic body unit 25 formed by the bulk iron core 41 and the plurality of laminated steel plates 42a, 42b, 42c, and 42d as described above. The stator 11 of this embodiment includes, for example, twenty-four stator magnetic poles 24 as L (L is an arbitrary integer) stator magnetic poles disposed apart from each other in the rotational direction R of the rotary shaft 2.

In this embodiment, the four laminated steel plates 42a, 42b, 42c, and 42d are provided to be shifted from each other in the rotational direction R of the rotary shaft 2. That is, the salient portions 44 of the laminated steel plates 42a, 42b, 42c, and 42d are disposed to be slightly shifted from each other in the rotational direction R of the rotary shaft 2. In this way, a structure equivalent to a skew structure is realized. This content will be described in detail later.

Next, the rotor 12 of this embodiment will be described.

As shown in FIG. 7, each rotor 12 includes a bulk iron core 51, a plurality of laminated steel plates (i.e., electromagnetic steel plates) 52, and a plurality of permanent magnets 53.

The bulk iron core 51 is formed in the shape of a cylinder surrounding the rotary shaft 2. The bulk iron core 51 is attached to the outer peripheral surface of the rotary shaft 2.

Each of the plurality of the laminated steel plates 52 is formed in the shape of a ring surrounding the bulk iron core 51. Each of the plurality of the laminated steel plates 52 is fixed to the outer peripheral surface of the bulk iron core 51.

The plurality of permanent magnets 53 are provided at the laminated steel plate 52 of the rotor 12. The plurality of the permanent magnets 53 are arranged in the rotational direction R of the rotary shaft 2. The magnetization directions of two permanent magnets 53 adjacent to each other in the rotational direction R of the rotary shaft 2 have, for example, phases different from each other by 180°.

Further, the plurality of the permanent magnets 53 are each disposed at positions which face the salient portions 44 of the first and second laminated steel plates 42a and 42b and positions which face the salient portions 44 of the third and fourth laminated steel plates 42c and 42d. The magnetization directions of two permanent magnets 53 adjacent to each other in the axial direction Z of the rotary shaft 2 have, for example, phases different from each other by 180°.

In this embodiment, the rotor 12 includes a second ferromagnetic body unit 35 formed by the bulk iron core 51, the laminated steel plates 52, and the permanent magnets 53 as described above.

Figure 10:
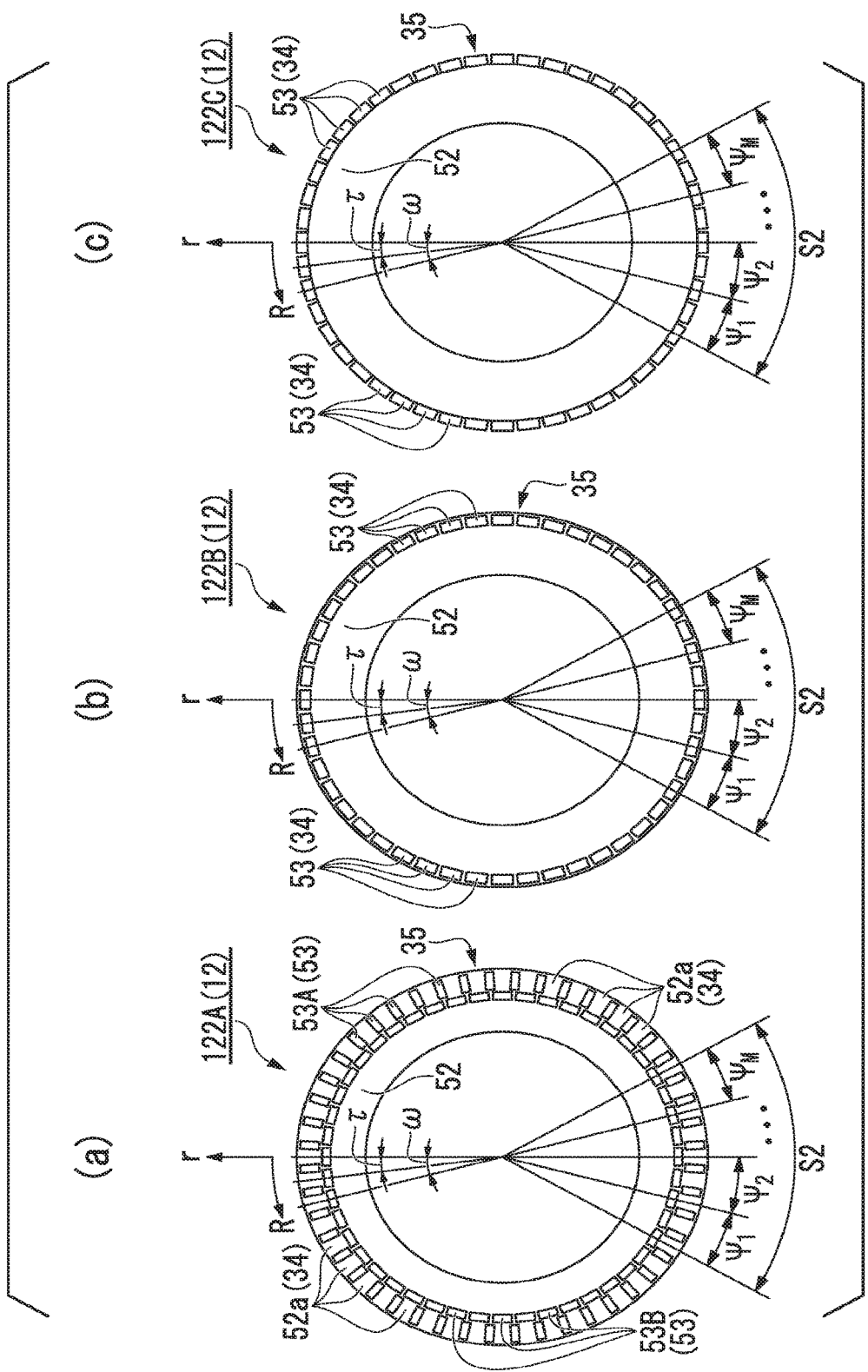
FIG. 10 is a front view showing rotors of the second embodiment.

FIG. 10 is a front view showing some types of the rotor 12 of this embodiment.

In FIG. 10, three types of rotors 122A, 122B, and 122C which can be adopted as the rotor 12 are shown. That is, the rotating electrical machine 1 may include any of the rotor 122A, the rotor 122B, and the rotor 122C. The above description relating to the bulk iron core 51, the laminated steel plates (i.e., the electromagnetic steel plates) 52, and the plurality of permanent magnets 53 is common in the rotor 122A, the rotor 122B, and the rotor 122C. Further, in the following description, when expressing the rotor 122A, the rotor 122B, and the rotor 122C without distinction, they are referred to simply as the rotor 12.

First, the rotor 122A shown in (a) of FIG. 10 will be described.

As shown in (a) of FIG. 10, the rotor 122A includes the laminated steel plate 52 and the plurality of permanent magnets 53. The plurality of permanent magnets 53 include a plurality of first permanent magnets 53A and a plurality of second permanent magnets 53B. The plurality of the first permanent magnets 53A and the plurality of the second permanent magnets 53B are provided in the laminated steel plate 52.

The plurality of the first permanent magnets 53A are disposed separately to be spaced apart from each other in the rotational direction R of the rotary shaft 2. The first permanent magnet 53A is magnetized, for example, in the rotational direction R of the rotary shaft 2.

The plurality of the second permanent magnets 53B are disposed further toward the inner periphery side in the radial direction r than the plurality of the first permanent magnets 53A. The plurality of the second permanent magnets 53B are arranged in the rotational direction R of the rotary shaft 2. The second permanent magnet 53B is magnetized, for example, in the radial direction r of the rotary shaft 2.

In the rotor 122A, the portions (hereinafter referred to as magnetic pole portions 52a) which are located between the plural first permanent magnets 53A, of the laminated steel plate 52, form magnetic poles which face the stator 11. That is, the magnetic pole portion 52a is an example of the "rotor magnetic pole 34". For this reason, the rotor 122A includes the plurality of rotor magnetic poles 34 disposed apart from each other in the rotational direction R of the rotary shaft 2. The plurality of the rotor magnetic poles 34 includes L rotor magnetic poles 34 having the same polarity as each other and disposed apart from each other in the rotational direction R of the rotary shaft 2.

For example, a plurality of magnetic pole portions 52a are alternately magnetized like "N-pole, S-pole, N-pole, S-pole, and . . . " in the rotational direction R of the rotary shaft 2 by the plurality of the permanent magnets 53. For this reason, the plurality of the rotor magnetic poles 34 of the rotor 122A include the L rotor magnetic poles 34 in which the N-pole faces the stator 11, and the L rotor magnetic poles 34 in which the S-pole faces the stator 11. In other words, in the rotor 122A, among the plurality of the rotor magnetic poles 34, the rotor magnetic poles 34 which are disposed every other correspond to the "L rotor magnetic poles 34".

Next, the rotor 122B shown in (b) of FIG. 10 will be described.

As shown in (b) of FIG. 10, the rotor 122B includes the laminated steel plate 52 and the plurality of permanent magnets 53. The plurality of the permanent magnets 53 are provided in the laminated steel plate 52. The plurality of the permanent magnets 53 are arranged in the rotational direction R of the rotary shaft 2. The permanent magnet 53 is magnetized, for example, in the radial direction r of the rotary shaft 2. The magnetization directions of two permanent magnets 53 adjacent to each other in the rotational direction R of the rotary shaft 2 have, for example, phases different from each other by 180°.

In the rotor 122B, each of the plurality of the permanent magnets 53 is an example of the "rotor magnetic pole 34". For this reason, the rotor 122B includes the plurality of the rotor magnetic poles 34 disposed apart from each other in the rotational direction R of the rotary shaft 2. The plurality of the rotor magnetic poles 34 include L rotor magnetic poles 34 having the same polarity as each other and disposed apart from each other in the rotational direction R of the rotary shaft 2. For example, the plurality of rotor magnetic poles 34 of the rotor 122B include the L rotor magnetic poles 34 in which the N-pole faces the stator 11, and the L rotor magnetic poles 34 in which the S-pole faces the stator 11. In other words, in the rotor 122B, among the plurality of the rotor magnetic poles 34, the rotor magnetic poles 34 which are disposed every other correspond to the "L rotor magnetic poles 34".

Next, the rotor 122C shown in (c) of FIG. 10 will be described.

As shown in (c) of FIG. 10, the rotor 122C includes the laminated steel plate 52 and the plurality of permanent magnets 53. The plurality of the permanent magnets 53 are mounted on the outer peripheral surface of the laminated steel plate 52.

The plurality of the permanent magnets 53 are arranged in the rotational direction R of the rotary shaft 2. The permanent magnet 53 is magnetized, for example, in the radial direction r of the rotary shaft 2. The magnetization directions of two permanent magnets 53 adjacent to each other in the rotational direction R of the rotary shaft 2 have, for example, phases different from each other by 180°.

In the rotor 122C, each of the plurality of the permanent magnets 53 is an example of the "rotor magnetic pole 34". For this reason, the rotor 122C includes the plurality of rotor magnetic poles 34 disposed apart from each other in the rotational direction R of the rotary shaft 2. The plurality of the rotor magnetic poles 34 include L rotor magnetic poles 34 having the same polarity as each other and disposed apart from each other in the rotational direction R of the rotary shaft 2. For example, the plurality of the rotor magnetic poles 34 of the rotor 122C include the L rotor magnetic poles 34 in which the N-pole faces the stator 11, and the L rotor magnetic poles 34 in which the S-pole faces the stator 11. In other words, in the rotor 122C, among the plurality of the rotor magnetic poles 34, the rotor magnetic poles 34 which are disposed every other correspond to the "L rotor magnetic poles 34".

Next, a distance between centers of the adjacent poles of the stator 11 and a distance between centers of the adjacent poles of the rotor 12 will be described. Also in this embodiment, either the M distances between centers of the adjacent poles ($\theta_1, \theta_2, \ldots,$ and $\theta_M$) of the stator 11 or the M distances between centers of the adjacent poles ($\psi_1, \psi_2, \ldots,$ and $\psi_M$) of the rotor 12 are set unequally.

Specifically, as shown in FIG. 9, each stator 11 includes the L stator magnetic poles 24. Then, the L stator magnetic poles 24 are disposed based on arbitrary M (M is an integer and M≤L) distances between the centers of the adjacent poles ($\theta_1, \theta_2, \ldots,$ and $\theta_M$), similar to the first embodiment.

Further, as shown in FIG. 10, each rotor 12 includes the L rotor magnetic poles 34. Then, the L rotor magnetic poles 34 are disposed based on arbitrary M (M is an integer and M≤L) distances between the centers of the adjacent poles ($\psi_1, \psi_2, \ldots,$ and $\psi_M$), similar to the first embodiment.

Then, also in this embodiment, either the M distances between the centers of the adjacent poles ($\theta_1, \theta_2, \ldots,$ and $\theta_M$) of the stator 11 or the M distances between the centers of the adjacent poles ($\psi_1, \psi_2, \ldots,$ and $\psi_M$) of the rotor 12 are set unequally. Specifically, if the period (a mechanical angle) of a torque pulsation to be reduced is φ, either the M distances between the centers of the adjacent poles ($\theta_1, \theta_2, \ldots,$ and $\theta_M$) or the M distances between the centers of the adjacent poles ($\psi_1, \psi_2, \ldots,$ and $\psi_M$) are a combination of $(\Theta, \Theta+\phi/M, \Theta+\phi\times2/M, \ldots,$ and $\Theta+\phi\times(M-1)/M)$. Here, $\Theta$ is an angle which is arbitrarily set.

More generally, in a case where the number of the stator magnetic poles 24 or the rotor magnetic poles 34 is L in the rotational direction R, in order to reduce $N\times1, N\times2, \ldots,$ and $N\times(M-1)$-order pulsation components (M and N are integers and $M\leq L$) with respect to the basic order of an electrical angle, either one set of the M distances between the centers of the adjacent poles $(\theta_1, \theta_2, \ldots,$ and $\theta_M)$ of the stator 11 or the M distances between the centers of the adjacent poles $(\psi_1, \psi_2, \ldots,$ and $\psi_M)$ of the rotor 12 is a combination of $(\Theta, \Theta+\Theta_1/M, \Theta+\Theta_1\times2/M, \ldots,$ and $\Theta+\Theta_1\times(M-1)/M)$. Here, $\Theta_1$ is, for example, $(360°/N)$ in the notation of electrical angle.

Further, the relationship $\Theta_1=(360°/N)$ is an example of the $\Theta_1$. $\Theta_1$ may have a range in the angle. It is favorable if $\Theta_1$ satisfies the relationship $(180°/N)<\Theta_1<(540°/N)$ in the notation of electrical angle.

In this embodiment, the M distances between the centers of the adjacent poles increase in order by $\Theta_1/M$ in the rotational direction R. That is, either the M distances between the centers of the adjacent poles $(\theta_1, \theta_2, \ldots,$ and $\theta_M)$ of the stator 11 or the M distances between the centers of the adjacent poles $(\psi_1, \psi_2, \ldots,$ and $\psi_M)$ of the rotor 12 increase in order by $\Theta_1/M$ in the rotational direction R.

Further, if the distance between the centers of the adjacent poles in the other set (i.e., the set in which the distances between the centers of the adjacent poles are equal) of the L stator magnetic poles 24 and the L rotor magnetic poles 34 is ω, $\Theta$ is set such that the sum of the M distances between the centers of the adjacent poles set unequally is Mω.

In other words, in the rotating electrical machine 1 which includes any of the rotors 122A, 122B, and 122C shown in FIG. 10, for example, in a case where the M distances between the centers of the adjacent poles of the stator magnetic poles 24 are set unequally, $\Theta$ is set such that the sum of the M distances between the centers of the adjacent poles of the stator magnetic poles 24 is 2Mτ. Here, τ is a pole pitch (e.g., the distance between the centers of the permanent magnets 53 adjacent to each other) of the magnetic poles in the rotor 12. Further, the same also applies to a case where the M distances between the centers of the adjacent poles of the rotor magnetic poles 34 are set unequally. That is, in a case where the M distances between the centers of the adjacent poles of the rotor magnetic poles 34 are set unequally, if each of equal distances between the centers of the adjacent poles of the plurality of the stator magnetic poles 24 is ω, $\Theta$ is set such that the sum of the M distances between the centers of the adjacent poles of the rotor magnetic poles 34 is Mω.

Further, the sum of the M distances between the centers of the adjacent poles is not limited to the above example. That is, the sum of the M distances between the centers of the adjacent poles may neither be Mω nor 2Mτ.

Next, a specific example will be described. For example, if the number of stator magnetic poles 24 is 24 (L=24), the number of distances between the centers of the adjacent poles is 2 (M=2), and a pulsation of the sixth-order harmonic component (N=6) due to a three-phase structure is a reduction target, the relationship, electrical angle $\Theta_1/M=((360°/6)/2)=30°$, is established. Further, this specific example can also be expressed in the same manner as that in FIG. 5 of the first embodiment.

In this embodiment, in addition to the unequal distance between the centers of the adjacent poles as described above, a skew which shifts the laminated steel plates 42a, 42b, 42c, and 42d from each other in the rotational direction R of the rotary shaft 2 is provided.

As shown in FIG. 8, for example, a skew angle between the salient portion 44 of the first laminated steel plate 42a and the salient portion 44 of the second laminated steel plate 42b is defined as a skew angle φ1. Further, a skew angle between the salient portion 44 of the third laminated steel plate 42c and the salient portion 44 of the fourth laminated steel plate 42d is defined as a skew angle φ2. Further, a skew angle between the salient portion 44 of the first laminated steel plate 42a and the salient portion 44 of the third laminated steel plate 42c is defined as a skew angle φ3. In a case where the rotating electrical machine 1 is designed to have 48 poles (i.e., the number of pole pairs is 24), the distance between the centers of the adjacent poles becomes 15° which is the value of 360°/24. Further, in the case of a three-phase structure, the largest pulsation component is the sixth-order (N=6), and therefore, the period of a torque pulsation becomes 2.5° which is the value of 15°/6.

For this reason, in order to reduce a pulsation having 2.5° period (the sixth-order harmonic component), the skew angle φ3 between two stator magnetic poles 24 is the value of (2.5°/2)=1.25°. Further, in this embodiment, each stator magnetic pole 24 is divided into two portions by the first and second laminated steel plates 42a and 42b or the third and fourth laminated steel plates 42c and 42d. For this reason, in order to further reduce a pulsation having 2.5° period (the sixth-order harmonic component), the skew angles φ1 and φ2 are set to the value of (2.5°/2)=1.25°.

Next, the principle in which a torque pulsation is reduced by the unequal distance between the centers of the adjacent poles will be described.

Figure 11:
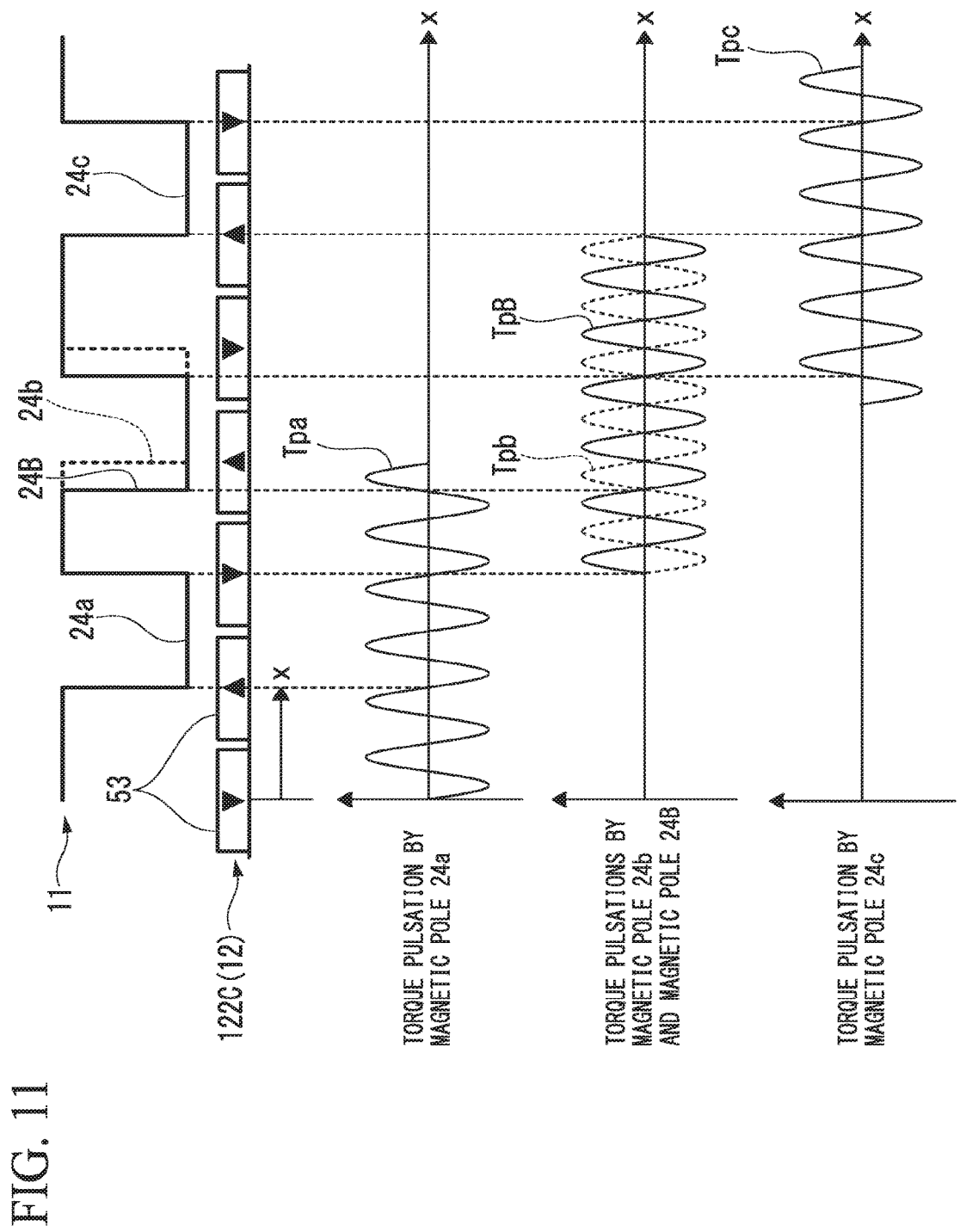
FIG. 11 is a diagram showing an example of the principle of reducing a torque pulsation.

FIG. 11 is a diagram showing an example of the principle of reducing a torque pulsation in a case of assuming that N is 6 and M is 2, and the stator 11 and the rotor 122C are taken as an example. Further, in FIG. 11, description is made by taking the configurations of the stator 11 and the rotor 122C of this embodiment. However, also with respect to the configurations of other rotors 12 of this embodiment, and the first embodiment, the principle capable of reducing a torque pulsation is the same.

As shown in FIG. 11, the stator magnetic pole 24 of the stator 11 includes a plurality of stator magnetic poles 24a, 24b, and 24c arranged in the rotational direction R of the rotary shaft 2. The stator magnetic poles 24a, 24b, and 24c are disposed at regular intervals. Sixth-order torque pulsations Tpa, Tpb, and Tpc which are generated by the stator magnetic poles 24a, 24b, and 24c have the same phase with respect to the position x in the traveling direction of the permanent magnets 53 of the rotor 12. For this reason, the torque pulsations Tpa, Tpb, and Tpc are intensified with each other. A black triangle stated in the permanent magnet 53 indicates a magnetization direction.

On the other hand, the stator magnetic pole 24B is the stator magnetic pole disposed at the position shifted by a half cycle of the sixth-order torque pulsation with respect to the stator magnetic pole 24b. A torque pulsation TpB which is generated from the stator magnetic pole 24B is shifted by a half cycle with respect to the torque pulsations Tpa and Tpc which are generated from the stator magnetic poles 24a and 24c. For this reason, the torque pulsation TpB offsets at least a portion of each of the torque pulsations Tpa and Tpc. In this way, it is possible to reduce the sixth-order torque pulsation.

Next, the details of the structure of the rotor 12 of this embodiment will be described.

Figure 12:
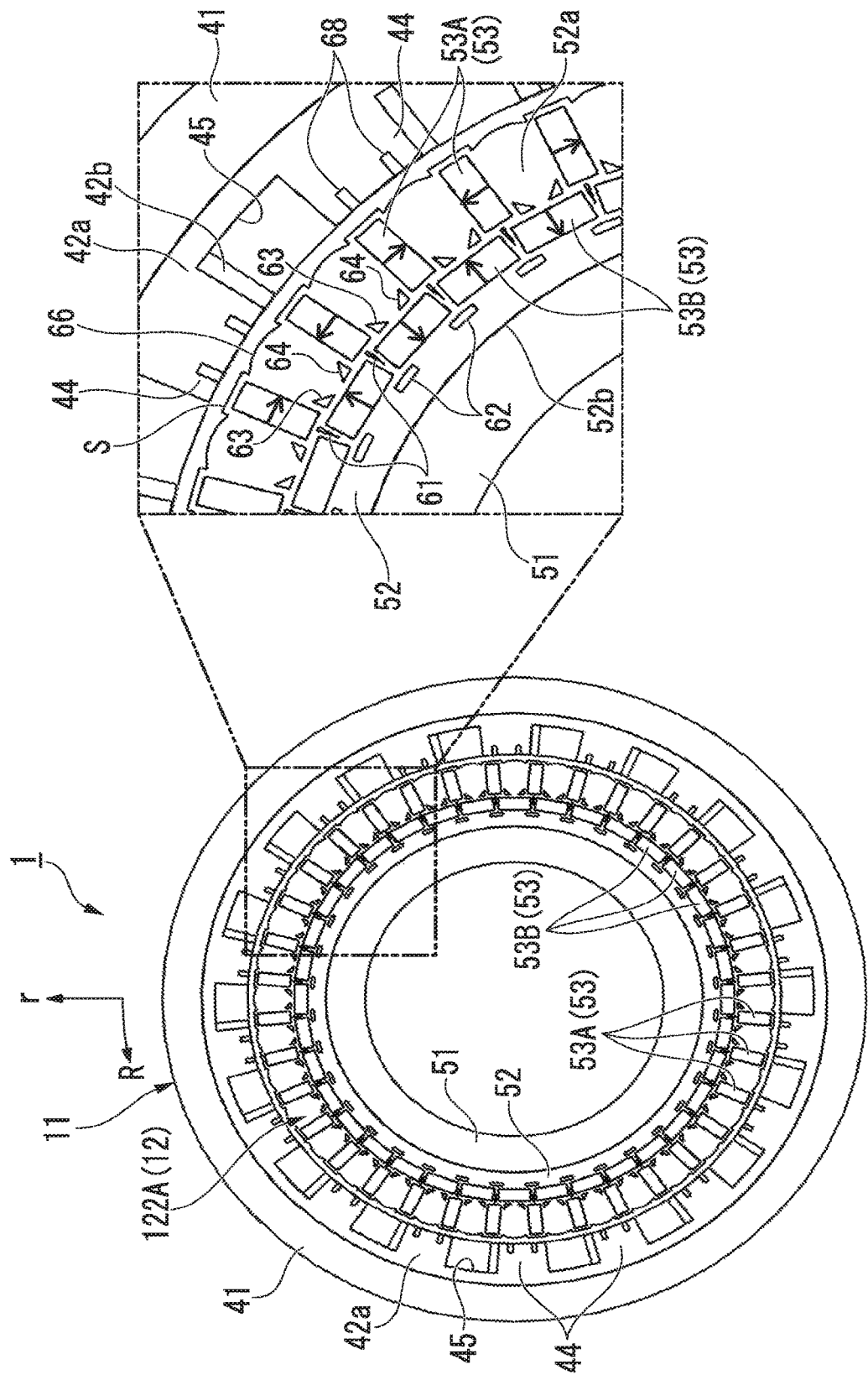
FIG. 12 is a front view zooming in a portion of the rotor of the second embodiment.

FIG. 12 is a front view zooming in a portion of the rotor 122A.

As shown in FIG. 12, the plurality of permanent magnets 53 are embedded in a circular pattern at regular intervals in the laminated steel plate 52 of the rotor 122A. Further, an arrow in the drawing indicates a magnetization direction of the permanent magnet 53.

As described above, the plurality of permanent magnets 53 include the plurality of first permanent magnets 53A and the plurality of second permanent magnets 53B, as described above.

The plurality of first permanent magnets 53A are disposed separately to be spaced apart from each other in the rotational direction R of the rotary shaft 2. The first permanent magnet 53A is magnetized, for example, in the rotational direction R of the rotary shaft 2. The magnetization directions of two first permanent magnets 53A adjacent to each other in the rotational direction R of the rotary shaft 2 are opposite to each other.

Further, the plurality of second permanent magnets 53B are arranged in the rotational direction R of the rotary shaft 2. The second permanent magnet 53B is magnetized, for example, in the radial direction r of the rotary shaft 2. The magnetization directions of two second permanent magnets 53B adjacent to each other in the rotational direction R of the rotary shaft 2 are opposite to each other. Further, the plurality of second permanent magnets 53B are disposed farther away from a surface (a peripheral surface) S of the rotor 12, which faces the stator 11, than the plurality of the first permanent magnets 53A are.

As shown in FIG. 12, in a case of being viewed along the radial direction r of the rotary shaft 2, an area (i.e., the magnetic pole portion 52a) between the first permanent magnets 53A is covered with the second permanent magnet 53B. Further, from a different point of view, an inner peripheral surface 52b of the laminated steel plate 52 is surrounded by the plurality of the first permanent magnets 53A and the plurality of the second permanent magnets 53B from the outer periphery side in the radial direction r of the rotary shaft 2.

Here, some of magnetic fluxes which are emitted from the permanent magnets 53A and 53B pass through the portion facing the side surfaces of the permanent magnets 53A and 53B, of the laminated steel plate 52, and return back to the same permanent magnets 53A and 53B. These magnetic fluxes of the permanent magnets 53A and 53B, which are emitted in this manner, do not pass through the stator 11. For this reason, these magnetic fluxes do not contribute to the generation of torque. Therefore, as shown in FIG. 12, in the laminated steel plate 52, holes (flux barriers) 61, 62, 63, and 64 are provided in the vicinity of the side surfaces of each of the permanent magnets 53A and 53B. In this way, it becomes difficult for the magnetic fluxes of the permanent magnets 53A and 53B to pass through the laminated steel plate 52 in the vicinity of the side surfaces of the permanent magnets 53A and 53B. As a result, more magnetic fluxes act on the stator 11, and thereby it contributes to an increase in torque.

Specifically, the holes 61, 62, 63, and 64 which are provided in the laminated steel plate 52 include first to fourth holes 61, 62, 63, and 64.

The first hole 61 is provided at a position farther from the surface S of the rotor 122A than the plurality of the first permanent magnets 53A are. At least a portion of the first hole 61 is located between the plural second permanent magnets 53B in the rotational direction R of the rotary shaft 2. At least a portion of the first hole 61 overlaps the first permanent magnet 53A in the radial direction r of the rotary shaft 2. In other words, at least a portion of the first hole 61 faces the first permanent magnet 53A from a direction different from the magnetization direction of the first permanent magnet 53A.

The second hole 62 is provided at a position farther from the surface S of the rotor 122A than the plurality of the second permanent magnets 53B are. At least a portion of the second hole 62 overlaps the area between the second permanent magnets 53B in the radial direction r of the rotary shaft 2. In this embodiment, the second hole 62 covers the area between the second permanent magnets 53B in the radial direction r of the rotary shaft 2.

The third hole 63 and the fourth hole 64 are provided positions closer to the surface S of the rotor 122A than the plurality of the second permanent magnets 53B. The third hole 63 and the fourth hole 64 are provided along a pair of corner portions which is defined by two first permanent magnets 53A and the second permanent magnet 53B. Each of the third hole 63 and the fourth hole 64 is formed in a substantially triangular shape along the corner portion. A portion of each of the third hole 63 and the fourth hole 64 faces an end portion of the first permanent magnet 53A in the rotational direction R of the rotary shaft 2. Further, another portion of each of the third hole 63 and the fourth hole 64 faces the area between the first permanent magnet 53A and the second permanent magnet 53B in the rotational direction R of the rotary shaft 2.

Further, as shown in FIG. 12, slots 66 are provided in the surface S (i.e., the surface of the laminated steel plate 52) of the rotor 12. The slot 66 is located between the first permanent magnet 53A and the second permanent magnet 53B in the rotational direction R of the rotary shaft 2. The slot 66 is recessed from the surface of the laminated steel plate 52 to the inner periphery side in the radial direction r of the rotary shaft 2. The slot 66 has an arc-shaped bottom in which end portions of the slot 66 in the rotational direction R are deeper than a central portion of the slot 66 in the rotational direction R. That is, the slot 66 is made to be deeper in the vicinity of the first permanent magnet 53A than the central portion of the slot 66 in the rotational direction R. If the slot 66 as described above is provided, it is possible to suppress the magnetic fluxes of the permanent magnets 53A and 53B from concentrating in the vicinity of the permanent magnets 53A and 53B. In this way, it is possible to disperse the magnetic flux, and thus it is possible to further effectively reduce a torque pulsation. Further, the slots 66 are provided in the rotors 12 of all the driving elements 3a, 3b, and 3c. According to such a configuration, it is possible to further attain a reduction in torque pulsation.

Further, as shown in FIG. 12, a tip portion of the salient portion 44 of the stator 11 includes slots 68. The slot 68 is open in the tip surface of the salient portion 44 and is recessed to the outer periphery side in the radial direction r of the rotor 12. If the slot 68 as described above is provided, in an air gap between the stator 11 and the rotor 12, magnetic flux density by the permanent magnets 53A and 53B has an almost sinusoidal distribution in the rotational direction R. In this way, it is possible to further reduce a torque pulsation. Further, the slots 68 are provided in the rotors 12 of all the driving elements 3a, 3b, and 3c. According to such a configuration, it is possible to further attain a reduction in torque pulsation.

According to the rotating electrical machine 1 having the configuration as described above, it is possible to attain a reduction in pulsation component of torque with respect to the rotational position at the time of non-energization and the time of energization.

That is, each of the rotating electrical machine 1 of the first and second embodiments includes the ring coil 21, the L (L is an arbitrary integer) stator magnetic poles 24, and the L rotor magnetic poles 34. The ring coil 21 has an annular shape along the rotational direction R of the rotary shaft 2. The L stator magnetic poles 24 are disposed apart from each other in the rotational direction R and face the ring coil 21. The L rotor magnetic poles 34 have the same phase as each other, are disposed apart from each other in the rotational direction R, and face the L stator magnetic poles 24. Then, if the order of the fundamental wave component of a torque pulsation is N, M distances between the centers of the adjacent poles in either one set of the L stator magnetic poles 24 or the L rotor magnetic poles 34 are combinations of ($\Theta$, $\Theta+\Theta_1/M$, $\Theta+\Theta_1\times2/M$, . . . , and $\Theta+\Theta_1\times(M-1)/M$), and $\Theta_1$ satisfies the relationship $(180°/N)<\Theta_1<(540°/N)$ in the notation of electrical angle.

According to such a configuration, as described above, the phases of a torque pulsation which is generated from one magnetic pole and a torque pulsation which is generated from another magnetic pole are shifted from each other. In this way, at least a portion of the torque pulsation which is generated from one magnetic pole and at least a portion of the torque pulsation which is generated from another magnetic pole are offset each other. In this way, it is possible to attain a reduction in torque pulsation at the time of non-energization and the time of energization. Further, according to the above configuration, for example, even if a skew is not provided in an iron core, it is possible to reduce a pulsation component of torque. In this way, it is possible to reduce a torque pulsation while maintaining high manufacturability.

Incidentally, rotating electrical machines other than the transverse flux rotating electrical machine have a structure in which the polarities of stator magnetic poles adjacent to each other are not same as each other. For this reason, even if an angle corresponding to a distance between centers of the adjacent poles in such a rotating electrical machine is applied to the rotating electrical machine 1 of this embodiment as it is, a case where it is not possible to attain a reduction in torque pulsation is assumed. On the other hand, by setting the distance between centers of the adjacent poles so as to satisfy the above-described relational expression of this embodiment, in the rotating electrical machine 1 in which the polarities of the stator magnetic poles 24 adjacent to each other are same as each other, as in this embodiment, it is possible to attain a reduction in torque pulsation.

Further, in the first and second embodiments described above, the above configuration is realized by making the distance between the magnetic poles (e.g., the slot interval between the magnetic poles) unequal. That is, in the first and second embodiments, the width of a tooth (i.e., a magnetic pole) is not changed. According to such a configuration, it is possible to reduce a torque pulsation without reducing the output torque of the rotating electrical machine 1.

Further, the expression "the order of the fundamental wave component of a torque pulsation is set to be N" described above may be read as the expression "the order of a harmonic component of a torque pulsation is set to be N×2, . . . , and N×(M−1)". By setting the distances between centers of the adjacent poles be M, it is also possible to reduce, for example, N×2, N×3, . . . , and N×(M−1)-order pulsation components with respect to the fundamental order in the notation of electrical angle. In this way, it is possible to further reduce a torque pulsation.

In this embodiment, if the distance between the centers of the adjacent poles in the other set (i.e., the set in which the M distances between the centers of the adjacent poles are equal) of either the L stator magnetic poles or the L rotor magnetic poles is ω, $\Theta$ is set such that the sum of the M distances between the centers of the adjacent poles is Mω.

According to such a configuration, it is possible to set the M distances between the centers of the adjacent poles unequal while making the sum of the M distances between the centers of the adjacent poles same as that in a case where the M distances between the centers of the adjacent poles are set equally.

In this embodiment, $\Theta_1$ is, for example, (360°/N) in the notation of electrical angle.

According to such a configuration, a torque pulsation which is generated from one magnetic pole and a torque pulsation which is generated from another magnetic pole are offset each other most efficiently. In this way, it is possible to further attain a reduction in torque pulsation.

In this embodiment, the M distances between the centers of the adjacent poles increase in order by $\Theta_1/M$ in the rotational direction R of the rotary shaft 2.

According to such a configuration, the phases of the torque pulsations which are generated from a plurality of magnetic poles are equally shifted from each other, and therefore, it is possible to further reduce a possibility that the torque pulsations generated from a plurality of magnetic poles may be locally intensified with each other. In this way, it is possible to more certainly attain a reduction in torque pulsation.

In this embodiment, the rotor 12 includes the laminated steel plate 52, the plurality of first permanent magnets 53A, and the plurality of second permanent magnets 53B. The plurality of first permanent magnets 53A are provided at least partially in the laminated steel plate 52 and are magnetized in the rotational direction R of the rotary shaft 2. The plurality of second permanent magnets 53B are provided at least partially in the laminated steel plate 52 and are magnetized in the radial direction r of the rotary shaft 2. The magnetization directions of two first permanent magnets 53A adjacent to each other in the rotational direction R, among the plurality of the first permanent magnets 53A, are opposite to each other. The magnetization directions of two second permanent magnets 53B adjacent to each other in the rotational direction R, among the plurality of the second permanent magnets 53B, are opposite to each other. The plurality of the second permanent magnets 53B are disposed at positions farther from the surface S of the rotor 12, which faces the stator 11, than the plurality of the first permanent magnets 53A are.

According to such a configuration, it is possible to create a large magnetic flux by the first permanent magnet 53A and the second permanent magnet 53B disposed in a two-layer structure with respect to the surface S of the rotor 12, which faces the stator 11. In this way, it is possible to enhance the output torque of the rotating electrical machine 1.

In this embodiment, the laminated steel plate 52 includes the first hole 61 at a position farther from the surface S of the rotor 12, which faces the stator 11, than the first permanent magnet 53A are. At least a portion of the first hole 61 overlaps the first permanent magnet 53A in the radial direction r of the rotary shaft 2.

According to such a configuration, for example, it is possible to suppress the magnetic flux emitted from the first permanent magnet 53A from returning back to the first permanent magnet 53A without passing through the stator 11. Further, it is possible to suppress the magnetic flux emitted from the second permanent magnet 53B from returning back to the second permanent magnet 53B without passing through the stator 11. In this way, it is possible to make more magnetic fluxes act for the generation of torque. In this way, it is possible to further enhance the output torque of the rotating electrical machine 1.

In this embodiment, at least a portion of the first hole 61 is located between the second permanent magnets 53B in the rotational direction R of the rotary shaft 2.

According to such a configuration, the first hole 61 is disposed by using the space between the second permanent magnets 53B. In this way, it is possible to make more magnetic fluxes act for the generation of torque and to avoid an increase in the size of the rotor 12 or the stator 11 by providing the first hole 61.

In this embodiment, the laminated steel plate 52 includes the second hole 62 provided at a position farther from the surface S of the rotor 12 than the plurality of second permanent magnets 53B are. At least a portion of the second hole 62 overlaps the area between the plural second permanent magnets 53B in the radial direction r of the rotary shaft 2.

According to such a configuration, the magnetic flux path is narrowed, and therefore, it is possible to suppress the magnetic fluxes emitted from the first and second permanent magnets 53A and 53B from directly returning back to the original magnets 53A and 53B through the vicinity (e.g., the side surfaces) of the magnets 53A and 53B. In this way, it is possible to suppress leakage of the magnetic flux and it is possible to make more magnetic fluxes act for the generation of torque. In this way, it is possible to further enhance the output torque of the rotating electrical machine 1.

The rotating electrical machine 1 of the first or second embodiments can also be expanded to various applications.

For example, in the first and second embodiments, the rotating electrical machine having a three-phase structure has been described. However, the configuration of this embodiment can also be applied to other multi-phase structures. That is, each of the rotating electrical machines 1 of the first and second embodiments may be a motor having a two-phase structure, a four-phase structure, a five-phase structure, or the like.

Further, at least one of the first and second ferromagnetic body units 25 and 35 may include a ferromagnetic body having a magnetic anisotropy in at least a portion of the first and second ferromagnetic body units 25 and 35. The magnetic anisotropy refers to the property that ease of magnetization is different according to direction.

For example, the U-shaped iron core 22 of the stator 11 of the first embodiment may be formed of a ferromagnetic body having a magnetic anisotropy in at least a portion of the U-shaped iron core 22. In this case, the U-shaped iron core 22 has, for example, a magnetic anisotropy in which magnetization is easily performed in a direction (refer to an arrow A1 in FIG. 2) toward the first portion 22a through the third portion 22c from the second portion 22b. Further, the I-shaped iron core 32 of the rotor 12 of the first embodiment may be formed of a ferromagnetic body having a magnetic anisotropy in at least a portion of the I-shaped iron core 32. In this case, the I-shaped iron core 32 has, for example, a magnetic anisotropy in which magnetization is easily performed in a direction (refer to an arrow A2 in FIG. 2) toward the portion facing the second portion 22b of the U-shaped iron core 22, from the portion facing the first portion 22a of the U-shaped iron core 22.

Further, the bulk iron core 41 of the stator 11 of the second embodiment may be formed of a ferromagnetic body having a magnetic anisotropy in at least a portion of the bulk iron core 41. In this case, the bulk iron core 41 has, for example, a magnetic anisotropy in which magnetization is easily performed in a direction (refer to an arrow A3 in FIG. 7) toward the first and second laminated steel plates 42a and 42b from the third and fourth laminated steel plates 42c and 42d. Further, each of the first to fourth laminated steel plates 42a, 42b, 42c, and 42d of the stator 11 may be formed of a ferromagnetic body having a magnetic anisotropy in at least a portion of the first to fourth laminated steel plates 42a, 42b, 42c, and 42d. In this case, each of the first to fourth laminated steel plates 42a, 42b, 42c, and 42d has, for example, a magnetic anisotropy in which magnetization is easily performed in the radial direction r of the rotary shaft 2. Further, the laminated steel plate 52 of the rotor 12 of the second embodiment may be formed of a ferromagnetic body having a magnetic anisotropy in at least a portion of the laminated steel plate 52. In this case, the laminated steel plate 52 has, for example, a magnetic anisotropy in which magnetization is easily performed in a direction (refer to an arrow A4 in FIG. 7) toward the portion facing the third and fourth laminated steel plates 42c and 42d of the stator 11, from the portion facing the first and second laminated steel plates 42a and 42b of the stator 11.

Next, a "system configuration of a rotating electrical machine drive system" in the first and second embodiments will be described.

Figure 13:
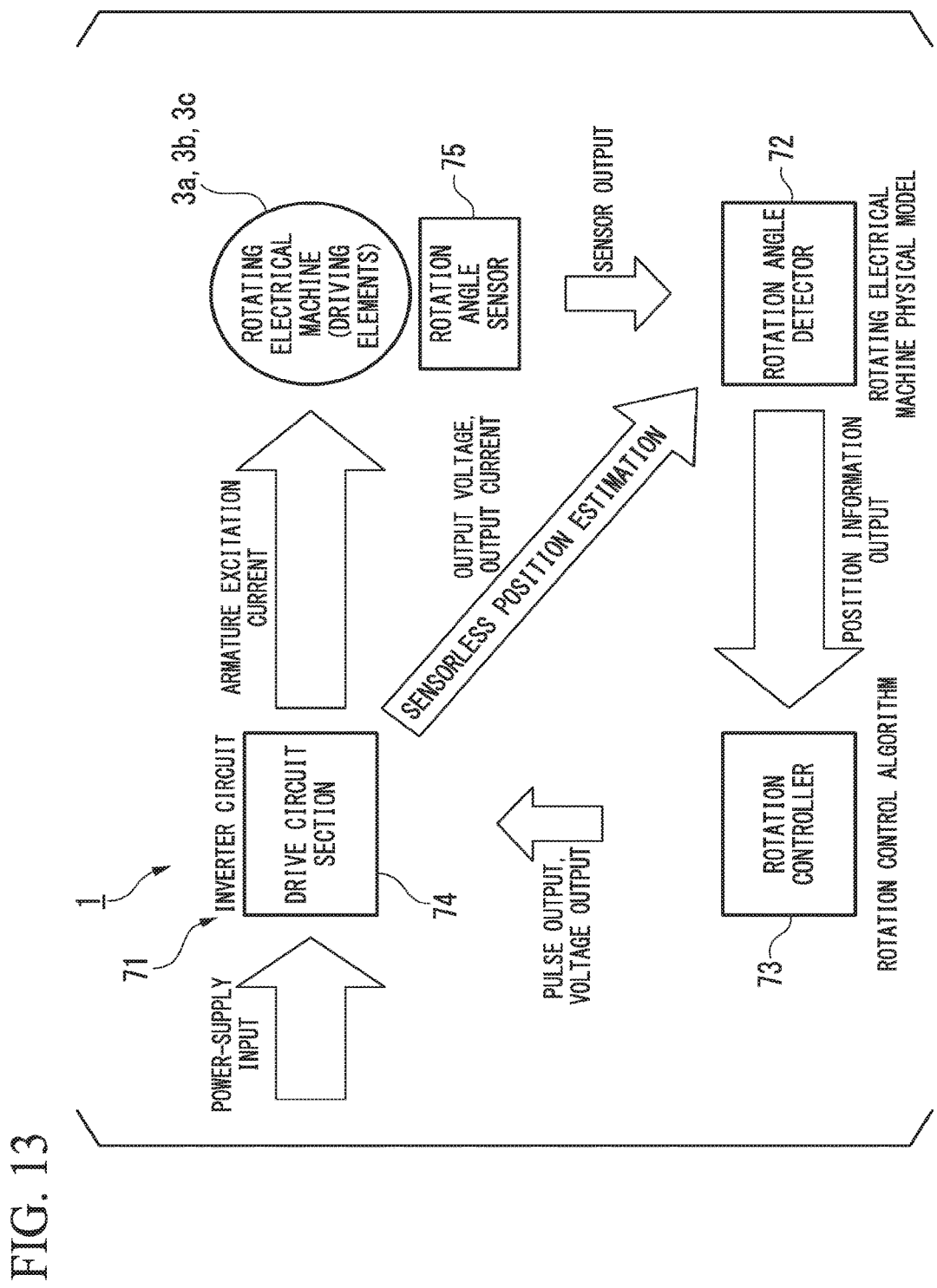
FIG. 13 is a block diagram showing a system configuration of a rotating electrical machine drive system in the first and second embodiments.

FIG. 13 is a block diagram showing a system configuration of a rotating electrical machine drive system 71.

As shown in FIG. 13, the rotating electrical machine drive system 71 which drives the rotating electrical machine 1 includes a rotation angle detector 72, a rotation controller 73, and a drive circuit section 74.

The rotation angle detector (e.g., measurement unit) 72 detects a rotation angle in the rotational direction R of the rotor 12. For example, the rotation angle detector 72 includes a rotation angle sensor 75 attached to the rotary shaft 2 of the rotating electrical machine 1. The rotation angle sensor 75 is, for example, an encoder. The rotation angle detector 72 detects a rotation angle from the sensor output of the rotation angle sensor 75. Instead of this, the rotation angle detector 72 may detect the rotation angle of the rotor 12, based on the voltage and the current that the drive circuit section 74 (described later) outputs, and a physical model of the rotating electrical machine 1. A method of detecting a rotation angle, based on the output of the drive circuit section 74 and the physical model of the rotating electrical machine 1, is referred to as sensorless position estimation.

The rotation controller (i.e., controller) 73 controls the drive circuit section 74, based on rotation angle information (e.g., a position information output) which is obtained from the detection result of the rotation angle detector 72. For example, the rotation controller 73 determines a voltage to be applied to the drive circuit section 74, based on the rotation angle information and a rotation control algorithm of the rotating electrical machine 1, and supplies the voltage to the drive circuit section 74. For example, the rotating electrical machine drive system 71 may perform angle feedback control, based on the sensor output of the rotation angle sensor 75 or the sensorless position estimation.

The drive circuit section 74 supplies a current (i.e., armature excitation current) to the ring coil (i.e., an armature winding) 21 of the rotating electrical machine 1, based on a pulse output and a voltage output which are output from the rotation controller 73, and a power supply which is supplied from a power-supply unit (not shown). In this way, torque is applied to the rotor 12 of the rotating electrical machine 1, whereby the rotating electrical machine 1 is driven.

Figure 14:
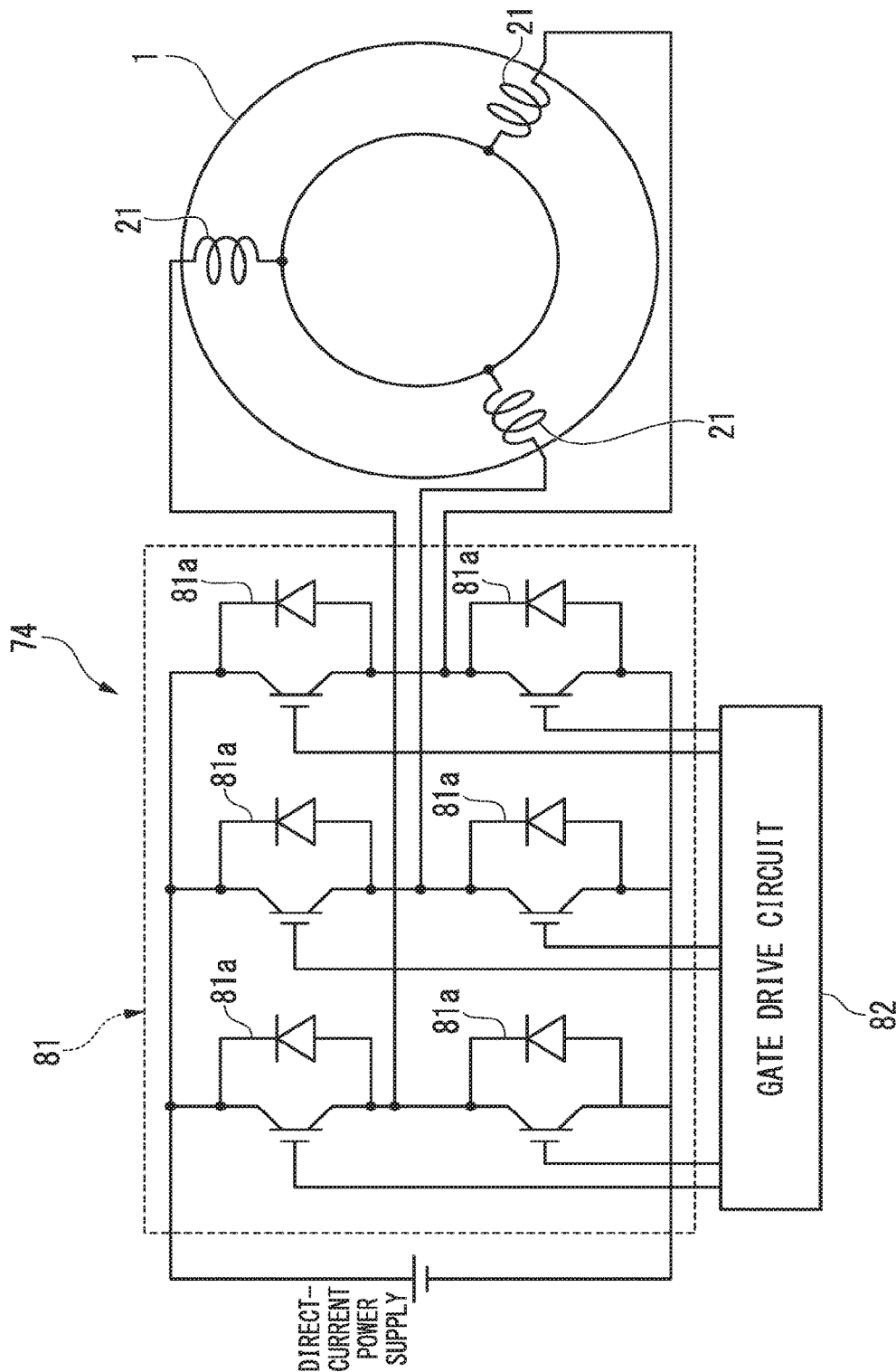
FIG. 14 is a circuit configuration diagram showing a configuration example of a drive circuit section in the first and second embodiments.

FIG. 14 is a circuit configuration diagram showing a configuration example of the drive circuit section 74.

As shown in FIG. 14, the drive circuit section 74 includes a switching circuit 81 and a gate drive circuit 82. The switching circuit 81 includes a plurality of switching sections 81a, each of which includes, for example, an insulated gate bipolar transistor (IGBT), a diode, and the like. Each switching section 81a is bridge-connected to the ring coil 21 of each phase. The switching section 81a is driven based on a pulse signal from the gate drive circuit 82. Here, a three-phase connection is assumed. However, even in a case where the number of phases is different, an identical switching circuit corresponding to the number of phases can be applied. Further, a power amplifier circuit (not shown) may be applied to the ring coil 21.

Figure 15:
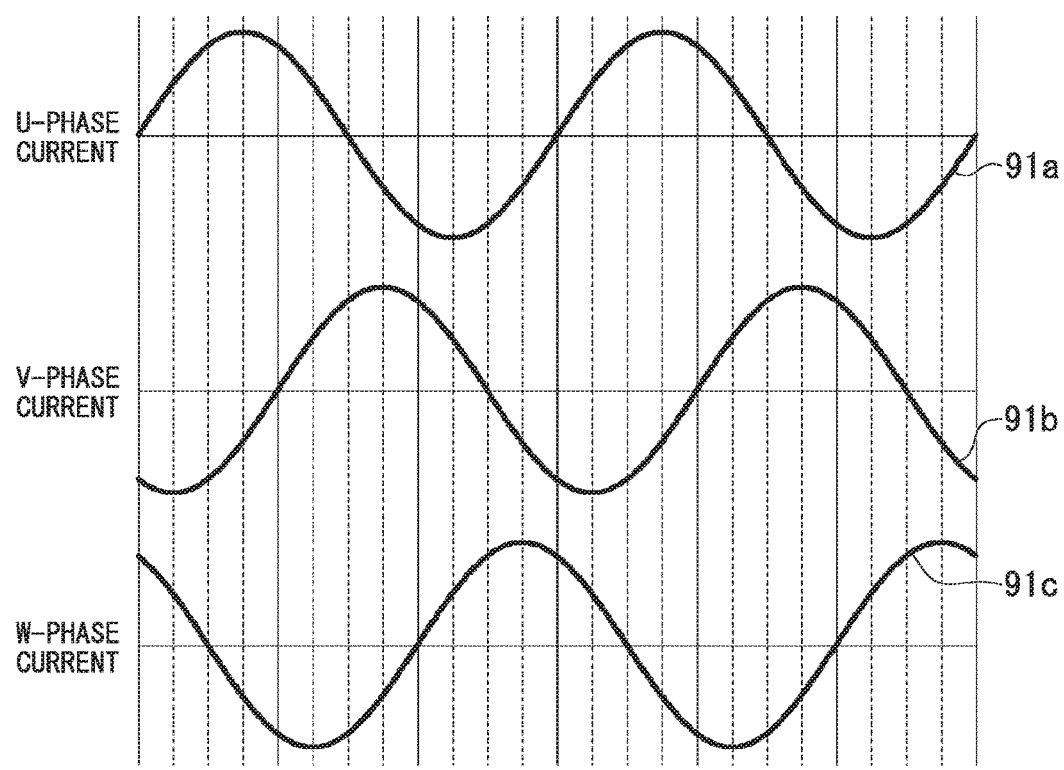
FIG. 15 is a diagram showing an example of a current flowing through a ring coil in the first and second embodiments.

FIG. 15 is a diagram showing an example of a current flowing through the ring coil 21. FIG. 15 shows an example of a current flowing through the ring coil 21 in a case where a three-phase connection is made.

FIG. 15 shows a three-phase current (e.g., a U-phase current 91a, a V-phase current 91b, and a W-phase current 91c), for example, in a case where PWM (Pulse Width Modulation) control using the switching circuit 81 is applied, or a case where the output of the power amplifier circuit (not shown) is applied. Actually, noise is included in the three-phase current. However, in FIG. 15, only fundamental wave components in which the phases are different by 120° are shown. The rotor 12 is driven at a speed corresponding to the frequency of the fundamental wave.

Figure 16:
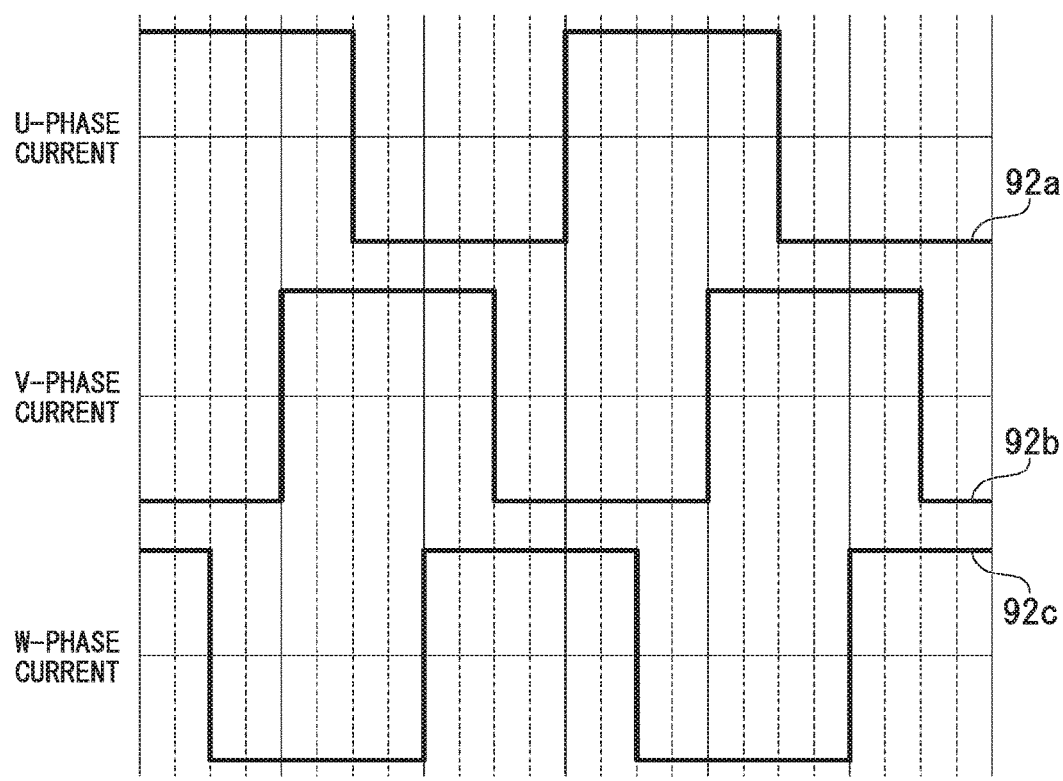
FIG. 16 is a diagram showing another example of a current flowing through the ring coil in the first and second embodiments.

FIG. 16 shows another example of a current flowing through the ring coil 21. FIG. 16 shows an example of a current flowing through the ring coil 21 when a three-phase connection is made similar to FIG. 15.

As shown in FIG. 16, a three-phase current (e.g., a U-phase current 92a, a V-phase current 92b, and a W-phase current 92c) having a rectangular wave shape, in which the phases are different by 120°, is supplied to the ring coil 21, based on, for example, pulse control using the switching circuit 81.

Figure 17:
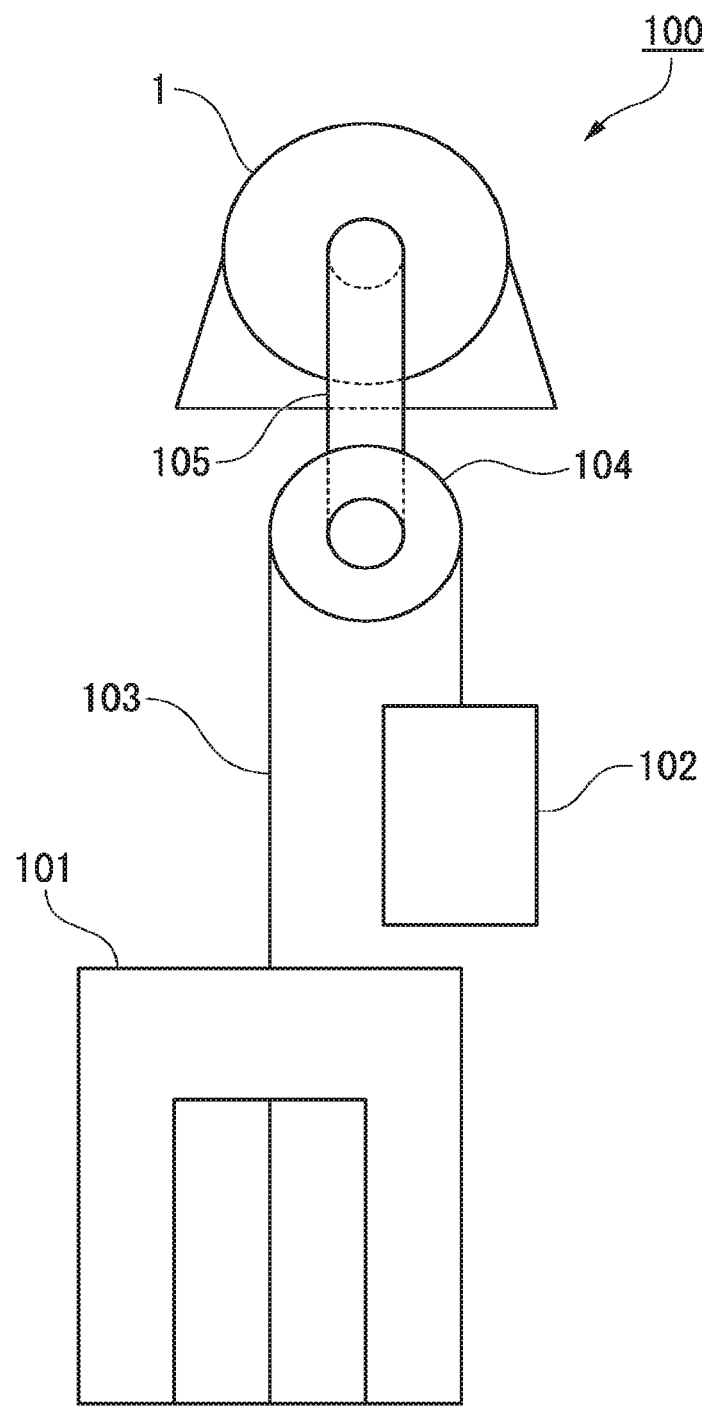
FIG. 17 is a side view showing an elevator in the first and second embodiments.

FIG. 17 shows an elevator 100 which includes the rotating electrical machine 1 of each of the first and second embodiments.

As shown in FIG. 17, the elevator 100 includes a car 101, a counterweight 102, a rope 103, a pulley 104, and the rotating electrical machine 1.

The car 101 is disposed in a hoistway and can move up and down along a guide rail (not shown). One end portion of the rope 103 is connected to the car 101.

The counterweight 102 is disposed in the hoistway and can move up and down along another guide rail (not shown). The other end portion of the rope 103 is connected to the counterweight 102.

The rope 103 is wound around the pulley (i.e., a sheave) 104.

The rotating electrical machine 1 is a hoisting machine which drives the pulley 104. The rotating electrical machine 1 is connected to the pulley 104 through a shaft 105. The rotating electrical machine 1 rotates the pulley 104, thereby moving the car 101 and the counterweight 102 up and down.

According to such a configuration, the elevator 100 includes the rotating electrical machine 1 having the configuration of the first or second embodiment and driving the car 101, and therefore, it is possible to attain a reduction in vibration of the car 101 based on a torque pulsation.

The rotating electrical machines 1 of the first and second embodiments have been described above. In addition, the rotating electrical machine 1 of an embodiment is not limited to the above examples.

For example, the M which is the number of distances between the centers of the adjacent poles may be two, three, four, or other number.

The rotating electrical machine 1 according to an embodiment is not limited to an example in which it is a radial gap motor in which the normal to the facing surfaces of the rotor 12 and the stator 11 is in the radial direction r of the rotary shaft 2, as in the first and second embodiments. The rotating electrical machine 1 of an embodiment may be an axial gap motor in which the normal to the facing surfaces of the rotor 12 and the stator 11 is in the axial direction Z of the rotary shaft 2. In the axial gap motor, a configuration of sandwiching the ring coil 21 between the stator iron cores from the radial direction r of the rotary shaft 2, instead of sandwiching the ring coil 21 between the stator iron cores from the axial direction Z of the rotary shaft 2, is made. Further, the rotating electrical machine 1 of an embodiment is not limited to an example in which the rotor 12 is an inner rotor which is located inside of the stator 11, as in the first and second embodiments. The rotating electrical machine 1 of an embodiment may include an outer rotor in which the rotor 12 is located outside of the stator 11.

Further, each of the rotating electrical machines 1 of the first and second embodiments is not limited to the hoisting machine of the elevator 100 and can be widely applied to a drive motor of a vehicle, various electric motors, a power generator, or other machines.

According to at least one of the embodiments described above, if the order of the fundamental wave component of a torque pulsation is N, M distances between centers of the adjacent poles in one set of either a plurality of stator magnetic poles or a plurality of rotor magnetic poles are combinations of $(\Theta, \Theta+\Theta_1/M, \Theta+\Theta_1\times2/M, \ldots,$ and $\Theta+\Theta_1\times(M-1)/M)$, and $\Theta_1$ satisfies the relationship $(180°/N)<\Theta_1<(540°/N)$ in the notation of electrical angle. According to such a configuration, it is possible to attain a reduction in pulsation component of torque.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rotating electrical machine comprising:
   an annular winding extending along a rotational direction of a rotary shaft;
   L (L is an arbitrary integer) stator magnetic poles disposed apart from each other in the rotational direction and facing the winding; and
   L rotor magnetic poles having the same polarity as each other, the L rotor magnetic poles being disposed apart from each other in the rotational direction and configured to face the L stator magnetic poles,
   wherein if an order of a fundamental wave component of a torque pulsation is N, M (M≤L) distances between centers of the adjacent poles in one set of either the L stator magnetic poles or the L rotor magnetic poles are combinations of (Θ, Θ+Θ$_1$/M, Θ+Θ$_1$×2/M, . . . , and Θ+Θ$_1$×(M−1)/M), and Θ$_1$ satisfies the relationship (180°/N)<Θ$_1$<(540°/N) in the notation of electrical angle.

2. The rotating electrical machine according to claim 1, wherein
if a distance between centers of the adjacent poles in the other set of either the L stator magnetic poles or the L rotor magnetic poles is ω, Θ is set such that the sum of the M distances between the centers of the adjacent poles is Mω.

3. The rotating electrical machine according to claim 1, wherein
Θ$_1$ is (360°/N) in the notation of electrical angle.

4. The rotating electrical machine according to claim 3, wherein
the M distances between the centers of the adjacent poles increase in order by Θ$_1$/M in the rotational direction.

5. The rotating electrical machine according to claim 1, further comprising:
a stator comprising the winding and the L stator magnetic poles; and
a rotor comprising the L rotor magnetic poles,
wherein the rotor further comprises an electromagnetic steel plate, a plurality of first permanent magnets, and a plurality of second permanent magnets, the plurality of first permanent magnets are provided at least partially in the electromagnetic steel plate and magnetized in the rotational direction, and the plurality of second permanent magnets are provided at least partially in the electromagnetic steel plate and magnetized in a radial direction of the rotary shaft,
magnetization directions of two first permanent magnets adjacent to each other in the rotational direction, among the plurality of first permanent magnets, are opposite to each other,
magnetization directions of two second permanent magnets adjacent to each other in the rotational direction, among the plurality of second permanent magnets, are opposite to each other, and
the rotor further comprises a surface facing the stator, and the plurality of second permanent magnets are disposed farther away from the surface of the rotor than the plurality of first permanent magnets are.

6. The rotating electrical machine according to claim 5, wherein
the electromagnetic steel plate has a first hole provided at a position farther from the surface of the rotor than the plurality of first permanent magnets are, and
at least a portion of the first hole overlaps one of the plurality of first permanent magnets in the radial direction.

7. The rotating electrical machine according to claim 6, wherein
at least a portion of the first hole is located between the plurality of second permanent magnets in the rotational direction.

8. The rotating electrical machine according to claim 5, wherein
the electromagnetic steel plate has a second hole provided at a position farther from the surface of the rotor than the plurality of second permanent magnets are, and
at least a portion of the second hole overlaps an area between the plurality of second permanent magnets in the radial direction.

9. An elevator comprising:
a car; and
a rotating electrical machine configured to drive the car, wherein the rotating electrical machine comprises:
an annular winding extending along a rotational direction of a rotary shaft;
L (L is an arbitrary integer) stator magnetic poles disposed apart from each other in the rotational direction and facing the winding; and
L rotor magnetic poles having the same polarity as each other, the L rotor magnetic poles being disposed apart from each other in the rotational direction and configured to face the L stator magnetic poles,
wherein if an order of a fundamental wave component of a torque pulsation is N, M (M≤L) distances between centers of the adjacent poles in one set of either the L stator magnetic poles or the L rotor magnetic poles are combinations of (Θ, Θ+Θ$_1$/M, Θ+Θ$_1$×2/M, . . . , and Θ+Θ$_1$×(M−1)/M), and Θ$_1$ satisfies the relationship (180°/N)<Θ$_1$<(540°/N) in the notation of electrical angle.

10. The elevator according to claim 9, wherein
if a distance between centers of the adjacent poles in the other set of either the L stator magnetic poles or the L rotor magnetic poles is ω, Θ is set such that the sum of the M distances between the centers of the adjacent poles is Mω.

11. The elevator according to claim 9, wherein
Θ$_1$ is (360°/N) in the notation of electrical angle.

12. The elevator according to claim 11, wherein
the M distances between the centers of the adjacent poles increase in order by Θ$_1$/M in the rotational direction.

13. The elevator according to claim 9,
wherein the rotating electrical machine further comprises:
a stator comprising the winding and the L stator magnetic poles; and
a rotor comprising the L rotor magnetic poles,
wherein the rotor further comprises an electromagnetic steel plate, a plurality of first permanent magnets, and a plurality of second permanent magnets, the plurality of first permanent magnets are provided at least partially in the electromagnetic steel plate and magnetized in the rotational direction, and the plurality of second permanent magnets are provided at least partially in the electromagnetic steel plate and magnetized in a radial direction of the rotary shaft,
magnetization directions of two first permanent magnets adjacent to each other in the rotational direction, among the plurality of first permanent magnets, are opposite to each other,
magnetization directions of two second permanent magnets adjacent to each other in the rotational direction, among the plurality of second permanent magnets, are opposite to each other, and
the rotor further comprises a surface facing the stator, and the plurality of second permanent magnets are disposed farther away from the surface of the rotor than the plurality of first permanent magnets are.

14. The elevator according to claim 13, wherein
the electromagnetic steel plate has a first hole provided at a position farther from the surface of the rotor than the plurality of first permanent magnets are, and
at least a portion of the first hole overlaps one of the plurality of first permanent magnets in the radial direction.

15. The elevator according to claim 14, wherein
at least a portion of the first hole is located between the plurality of second permanent magnets in the rotational direction.

16. The elevator according to claim 13, wherein
the electromagnetic steel plate has a second hole provided at a position farther from the surface of the rotor than the plurality of second permanent magnets are, and
at least a portion of the second hole overlaps an area between the plurality of second permanent magnets in the radial direction.

* * * * *